(12) United States Patent
Zhou et al.

(10) Patent No.: US 11,203,070 B2
(45) Date of Patent: Dec. 21, 2021

(54) SELF-ALIGNING CHUCK

(71) Applicants: APEX BRANDS, INC., Apex, NC (US); Jacobs Chuck Manufacturing Company, Ltd., Suzhou (CN)

(72) Inventors: Jichun Zhou, Jiangsu (CN); Sen Zhang, Jiangsu (CN)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 16/972,703

(22) PCT Filed: Jun. 7, 2018

(86) PCT No.: PCT/CN2018/090252
§ 371 (c)(1),
(2) Date: Dec. 7, 2020

(87) PCT Pub. No.: WO2019/232744
PCT Pub. Date: Dec. 12, 2019

(65) Prior Publication Data
US 2021/0252607 A1    Aug. 19, 2021

(51) Int. Cl.
*B23B 31/12* (2006.01)
(52) U.S. Cl.
CPC ........ *B23B 31/1238* (2013.01); *B23B 31/123* (2013.01); *B23B 31/1215* (2013.01); *B23B 2231/38* (2013.01); *B23B 2231/52* (2013.01)
(58) Field of Classification Search
CPC ............ B23B 31/1238; B23B 2231/52; B23B 31/1215; B23B 31/123; B23B 2231/38; Y10T 279/26; Y10T 279/29
See application file for complete search history.

(56) References Cited

U.S. PATENT DOCUMENTS 1,940,405 A * 12/1933 Englund ............... B23B 31/008
279/61
6,070,884 A    6/2000 Mack
(Continued)

FOREIGN PATENT DOCUMENTS

CN         101053910 A      10/2007
CN         205324767 U  *   6/2016
(Continued)

OTHER PUBLICATIONS

International Search Report and Written Opinion from International Application No. PCT/CN2018/090252 filed on Jun. 7, 2018.

*Primary Examiner* — Eric A. Gates
(74) *Attorney, Agent, or Firm* — Burr & Forman, LLP

(57) ABSTRACT

A chuck configured to be operably coupled to a power driver having a rotatable drive spindle is provided. The chuck (100) may include a body (130) having a center axis (50) and a plurality of clamping jaws (101) configured to clamp onto a working bit. The clamping jaws (101) may be configured to angularly translate relative to the center axis towards or away from a clamping jaw point of convergence (154) to close or open a working bit opening defined by the clamping jaws (101). The clamping jaw point of convergence (154) may be on the center axis. The chuck (100) may also include a plurality of bit alignment jaws (150). The bit alignment jaws (150) may be configured to maintain the working bit within the working bit opening by being configured translate towards or away from a bit alignment jaw point of convergence (153) that is on the center axis (50) and disposed rearward of the clamping jaw point of convergence (154).

14 Claims, 19 Drawing Sheets

(56) References Cited

U.S. PATENT DOCUMENTS

| | | | |
|---|---|---|---|
| 6,129,363 A | 10/2000 | Mack | |
| 6,726,222 B2 * | 4/2004 | Rohm | ................. B23B 31/1071 |
| | | | 279/125 |
| 7,563,061 B2 * | 7/2009 | Gibbons | ............ B23B 31/1207 |
| | | | 408/240 |
| 10,632,544 B2 * | 4/2020 | Xie | ......................... B23B 31/28 |

FOREIGN PATENT DOCUMENTS

| | | | | |
|---|---|---|---|---|
| EP | 0461806 A1 | 12/1991 | | |
| WO | 2007038906 A1 | 4/2007 | | |
| WO | WO-2012156120 A1 * | 11/2012 | ........... | B25D 17/088 |
| WO | WO-2017128813 A1 * | 8/2017 | ............. | B23B 31/12 |

* cited by examiner

SELF-ALIGNING CHUCK

TECHNICAL FIELD

Example embodiments generally relate to chucks for use with power drivers including drills, and more particularly, relate to chucks that are configured to receive and clamp onto a working bit.

BACKGROUND

Power drivers with rotating drive spindles are often operably coupled to a chuck that is adjustable in size to be able to clamp onto various working bits, such as drill bits or other tools that are rotated with the chuck by the drive spindle to perform a task. Conventional chucks typically employ moveable jaws, for example three moveable jaws, that are operable to adjust the diameter of an opening in the chuck for receiving a working bit. The jaws may be adjusted by rotating an external sleeve to change the size of the opening between the jaws for receiving the working bit. As the jaws open, gaps between the jaws also open, and, in some instances, a working bit may be small enough to fall into one of the gaps. A user may not realize that the working bit moved into such a gap and the user may begin tightening the jaws onto the working bit. Because the working bit is off-center and misaligned, the working bit cannot be used in this position, and therefore the user is required to reopen the jaws, center the working bit, and close the jaws again with the working bit in the center position. This re-centering of the working bit can create delays and lost productivity particularly in manufacturing assembly line environments.

SUMMARY OF SOME EXAMPLES

According to some example embodiments, an example chuck is provided for use with a power driver having a rotatable drive spindle. The example chuck may comprise a body having a center axis about which the body rotates and a plurality of clamping jaws configured to clamp onto a working bit. The clamping jaws may be configured to angularly translate relative to the center axis within clamping jaw passageways of the body towards or away from a clamping jaw point of convergence to close or open a working bit opening defined by the clamping jaws. The clamping jaw point of convergence may be on the center axis. Further, the example chuck may comprise a plurality of bit alignment jaws. The bit alignment jaws may be configured to maintain the working bit within the working bit opening by being configured translate towards or away from a bit alignment jaw point of convergence that is on the center axis and disposed rearward of the clamping jaw point of convergence.

According to some example embodiments, another example chuck is proved that may be configured to be operably coupled to a power driver having a rotatable drive spindle. The example chuck may comprise a body having a center axis about which the body rotates, a sleeve that is externally disposed and configured to rotate relative to the body, and a clamping jaw nut configured to rotate relative to the body with the sleeve. The clamping jaw nut may comprise a clamping jaw nut thread. The example chuck may further comprise a plurality of clamping jaws configured to clamp onto a working bit. In this regard, each clamping jaw may comprise a clamping jaw thread that is configured to operably couple with the clamping jaw nut thread. The clamping jaws may also be configured to angularly translate relative to the center axis within clamping jaw passageways of the body towards or away from a clamping jaw point of convergence to close or open a working bit opening defined by the clamping jaws due to the operable coupling of the clamping jaw nut thread with the clamping jaw threads. Further, the clamping jaw point of convergence is on the center axis. The example chuck may further comprise a plurality of bit alignment jaws. The bit alignment jaws may be configured to maintain the working bit within the working bit opening by being configured translate towards or away from a bit alignment jaw point of convergence that is on the center axis and disposed rearward of the clamping jaw point of convergence.

BRIEF DESCRIPTION OF THE DRAWINGS

Figure 1:
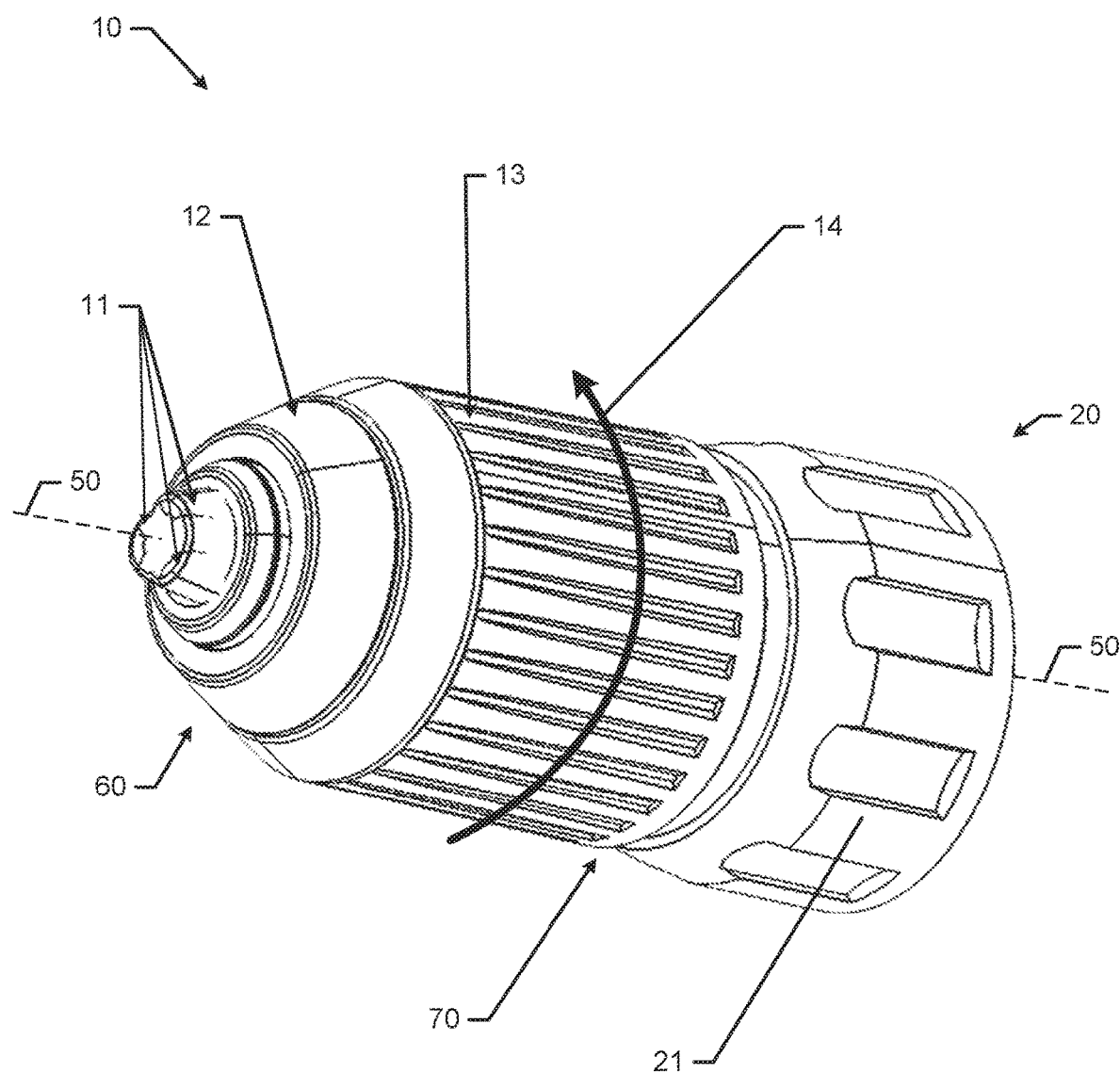
Figure 2:
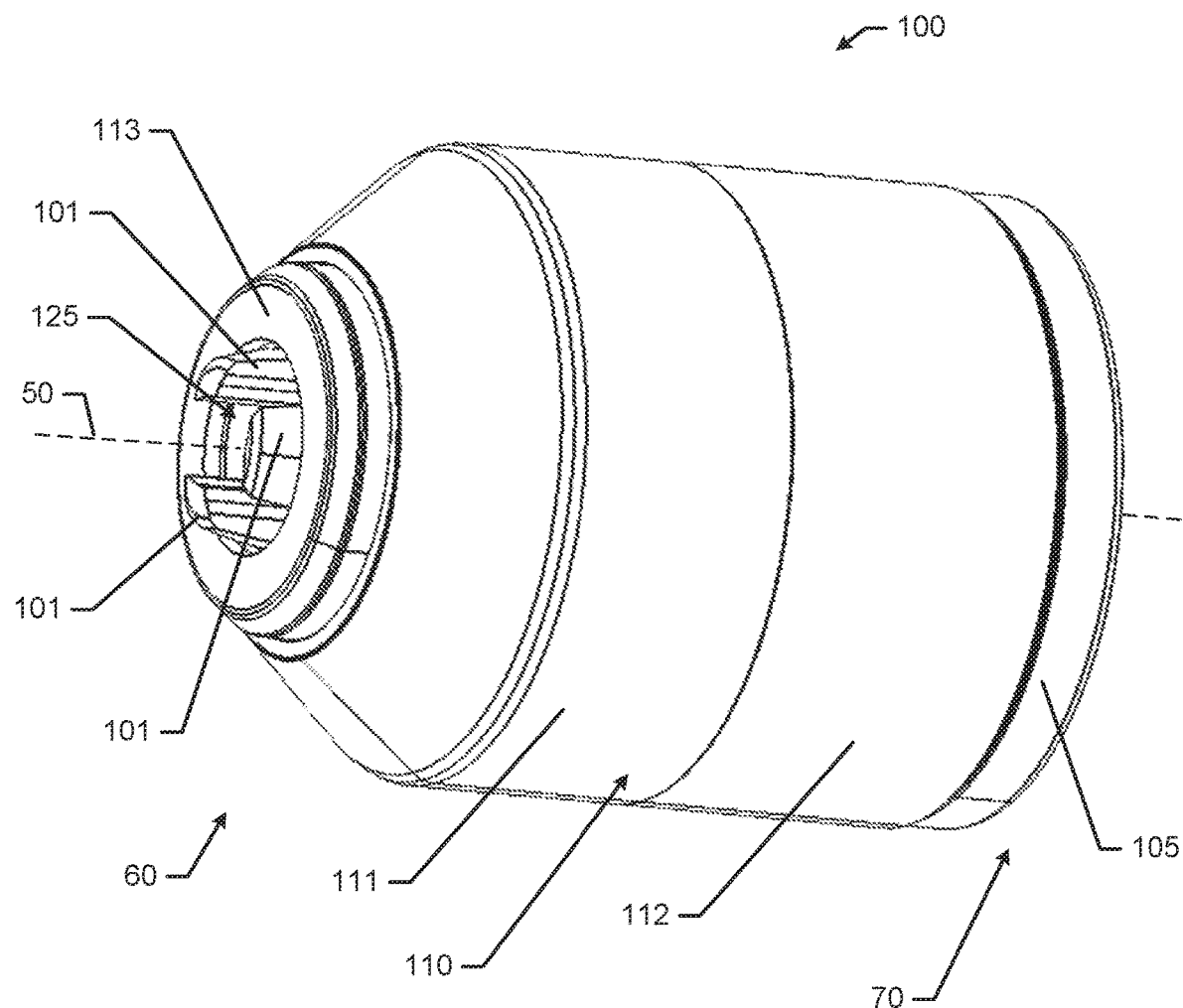
Figure 3:
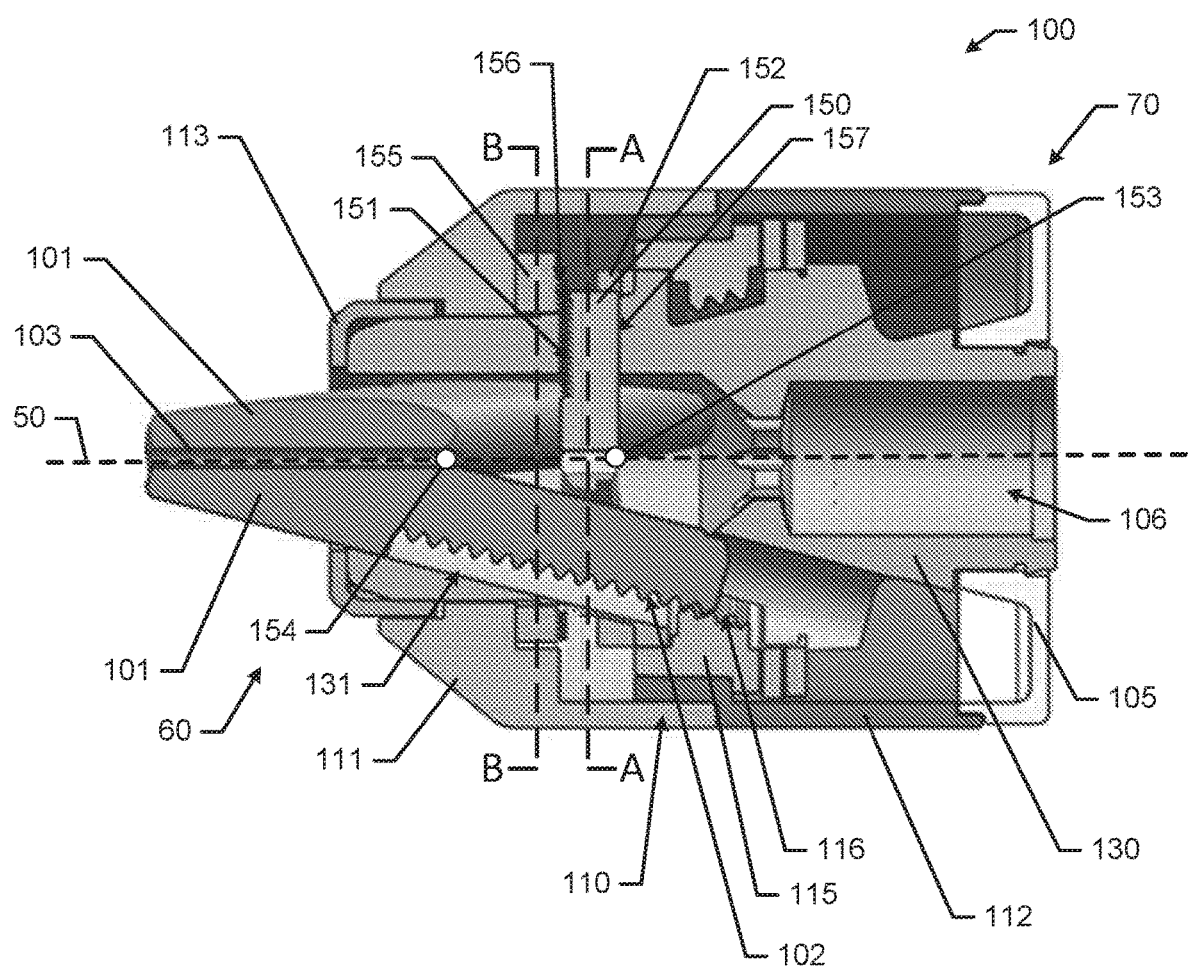
Figure 4:
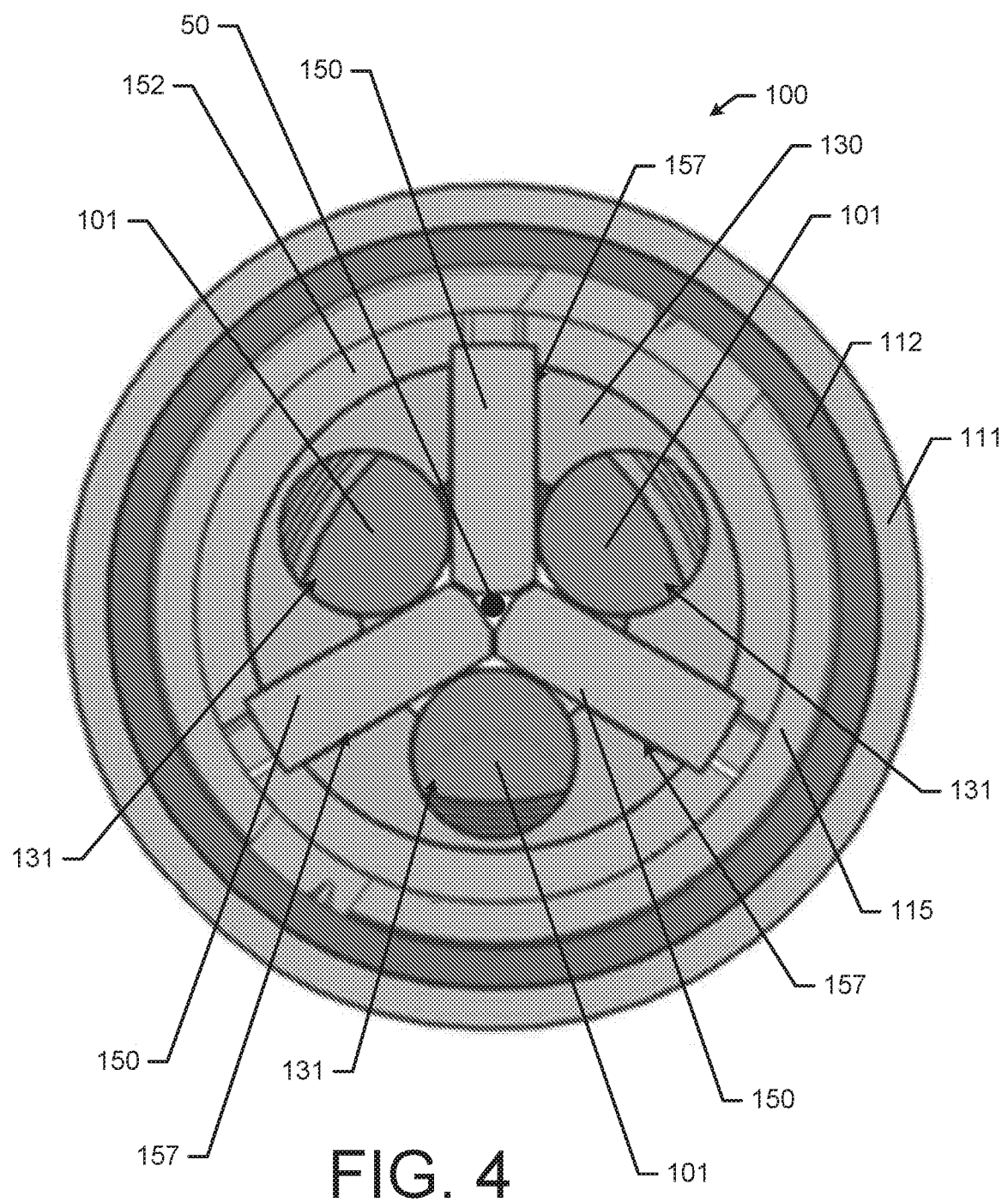
Figure 5:
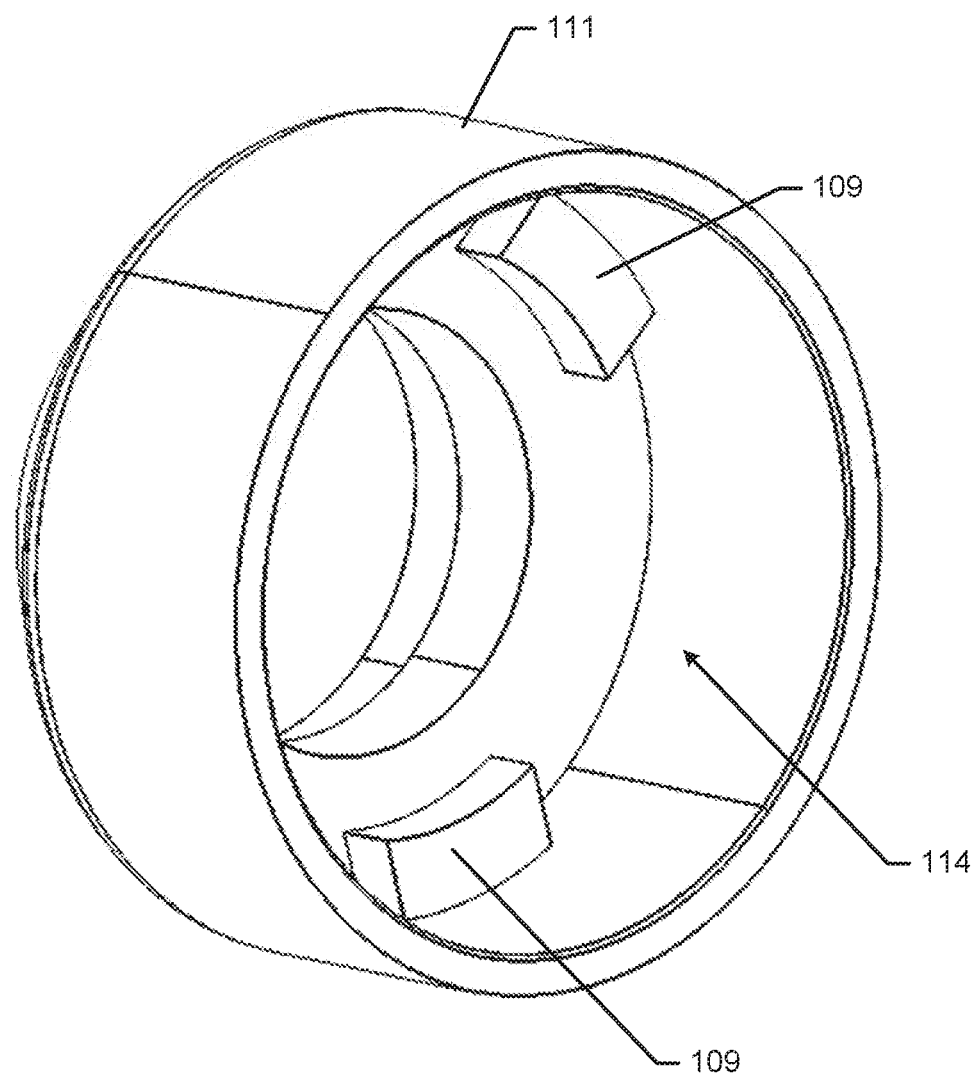
Figure 6:
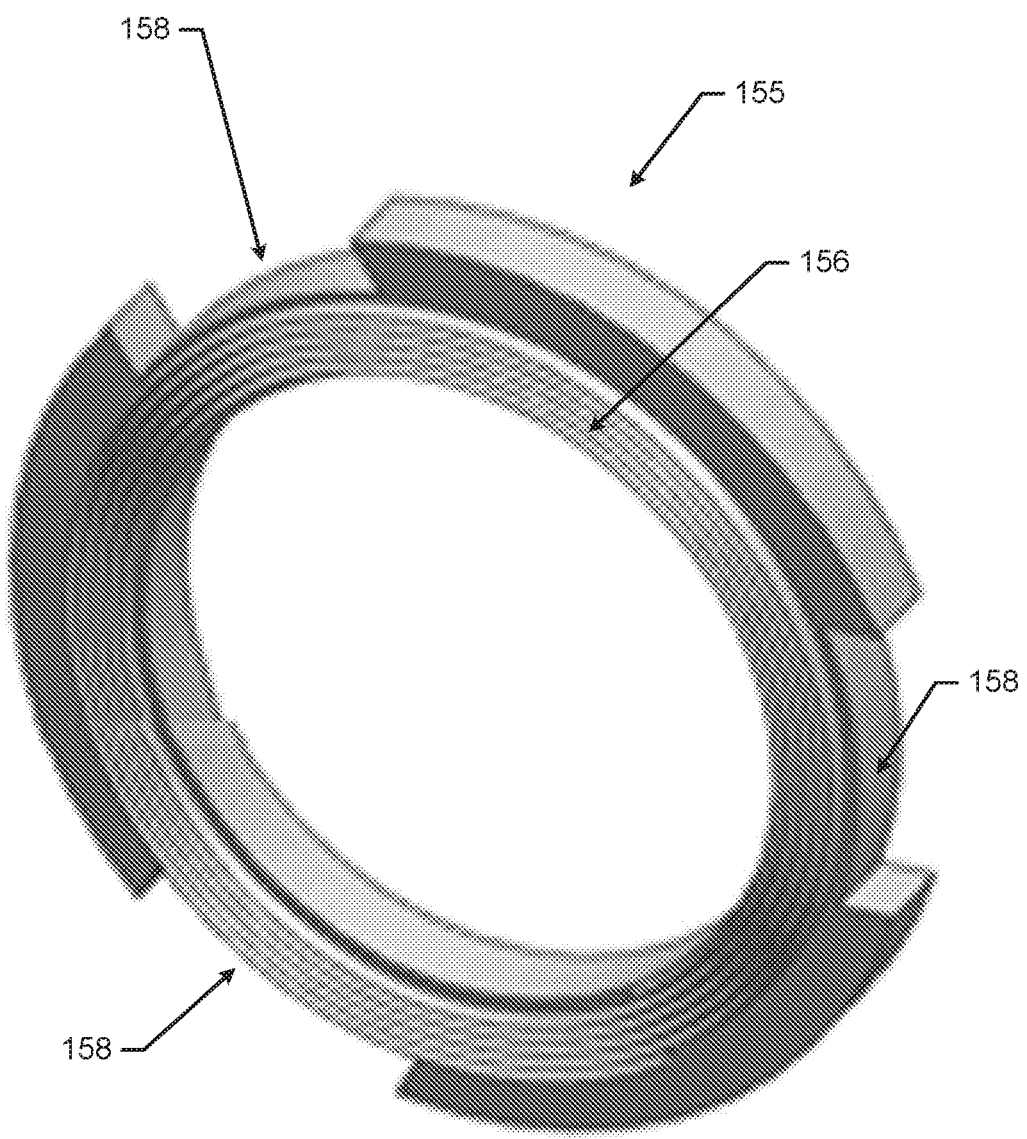
Figure 7:
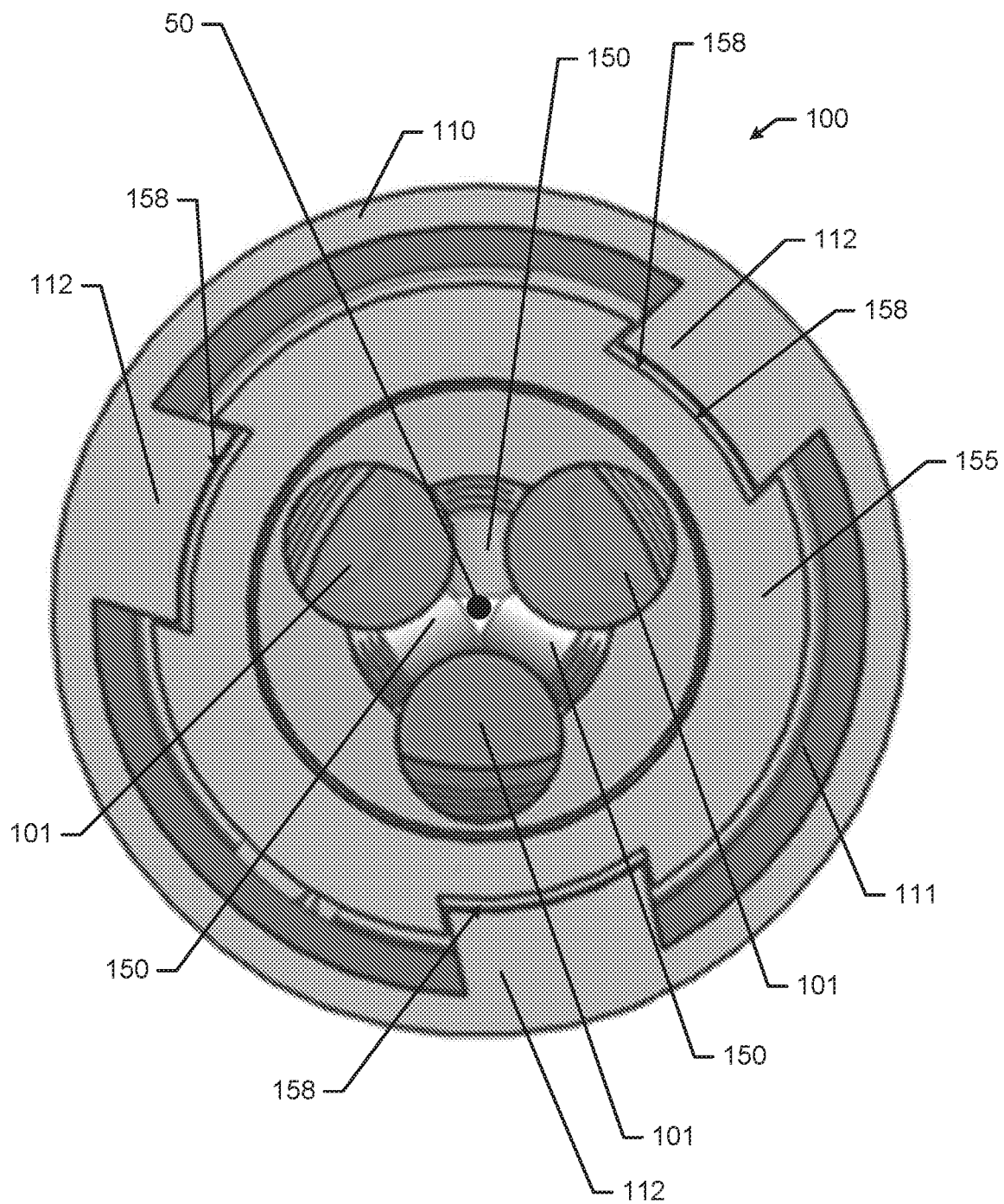
Figure 8:
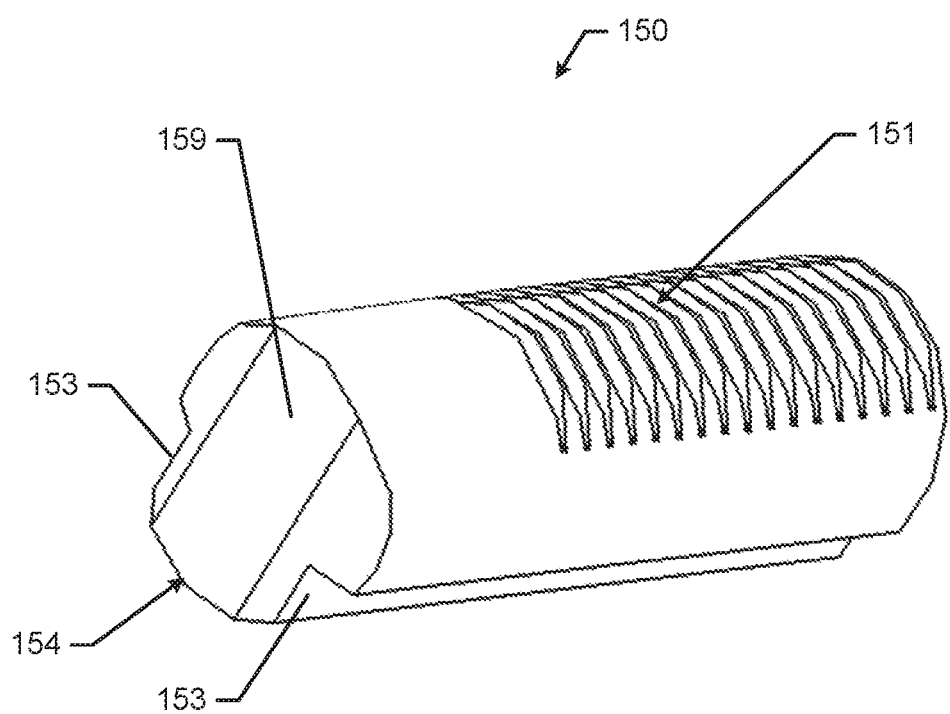
Figure 9:
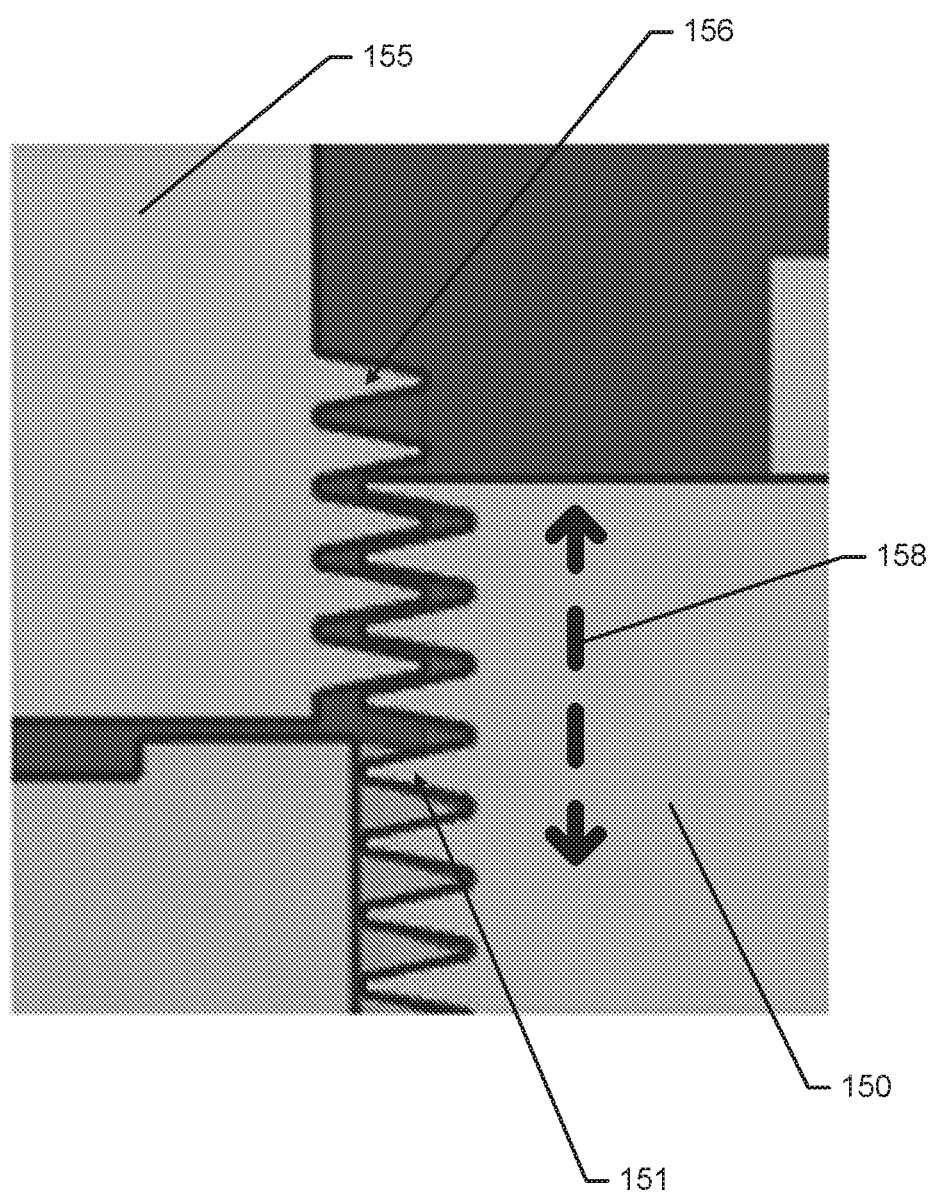
Figure 10:
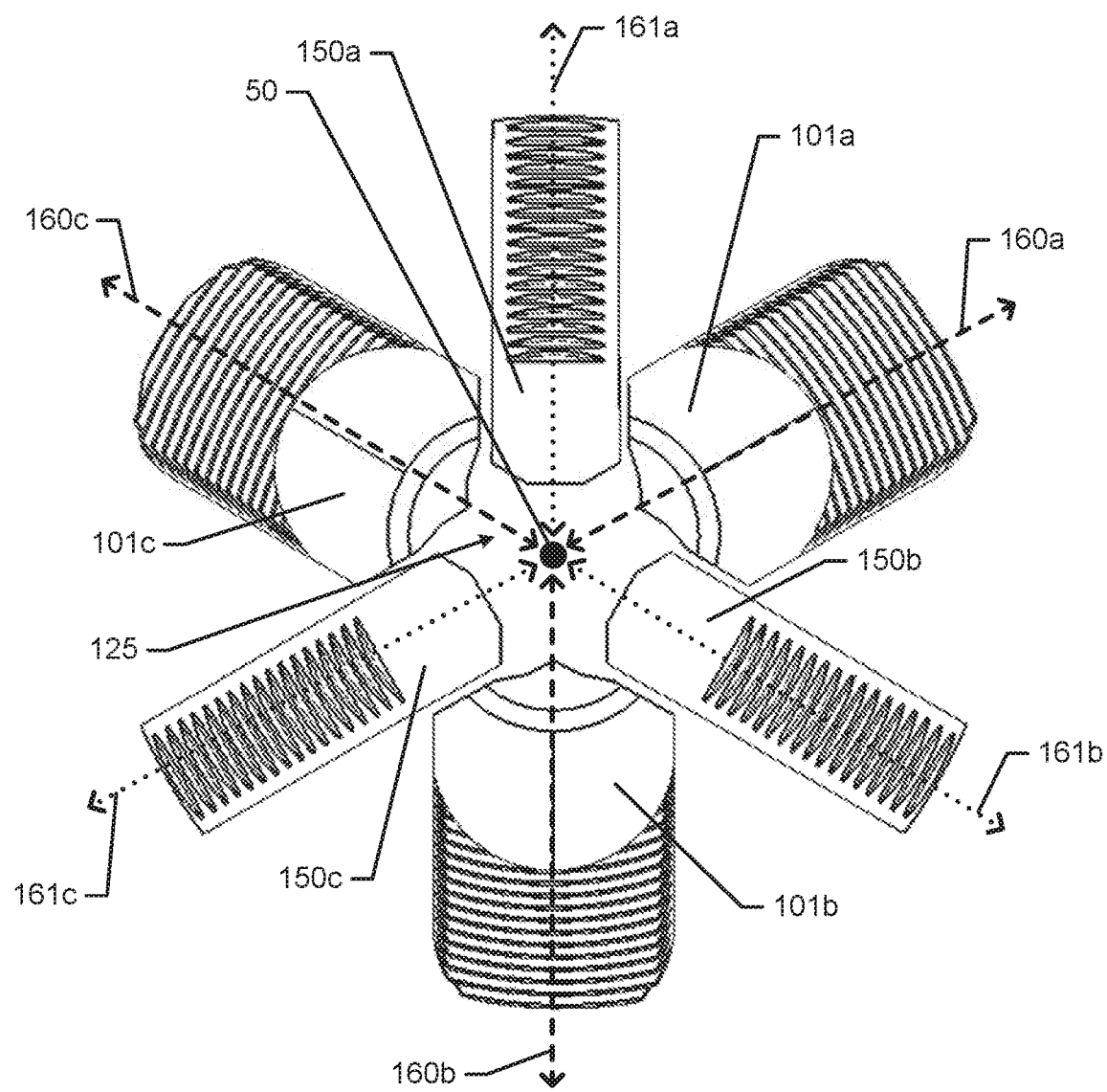
Figure 11:
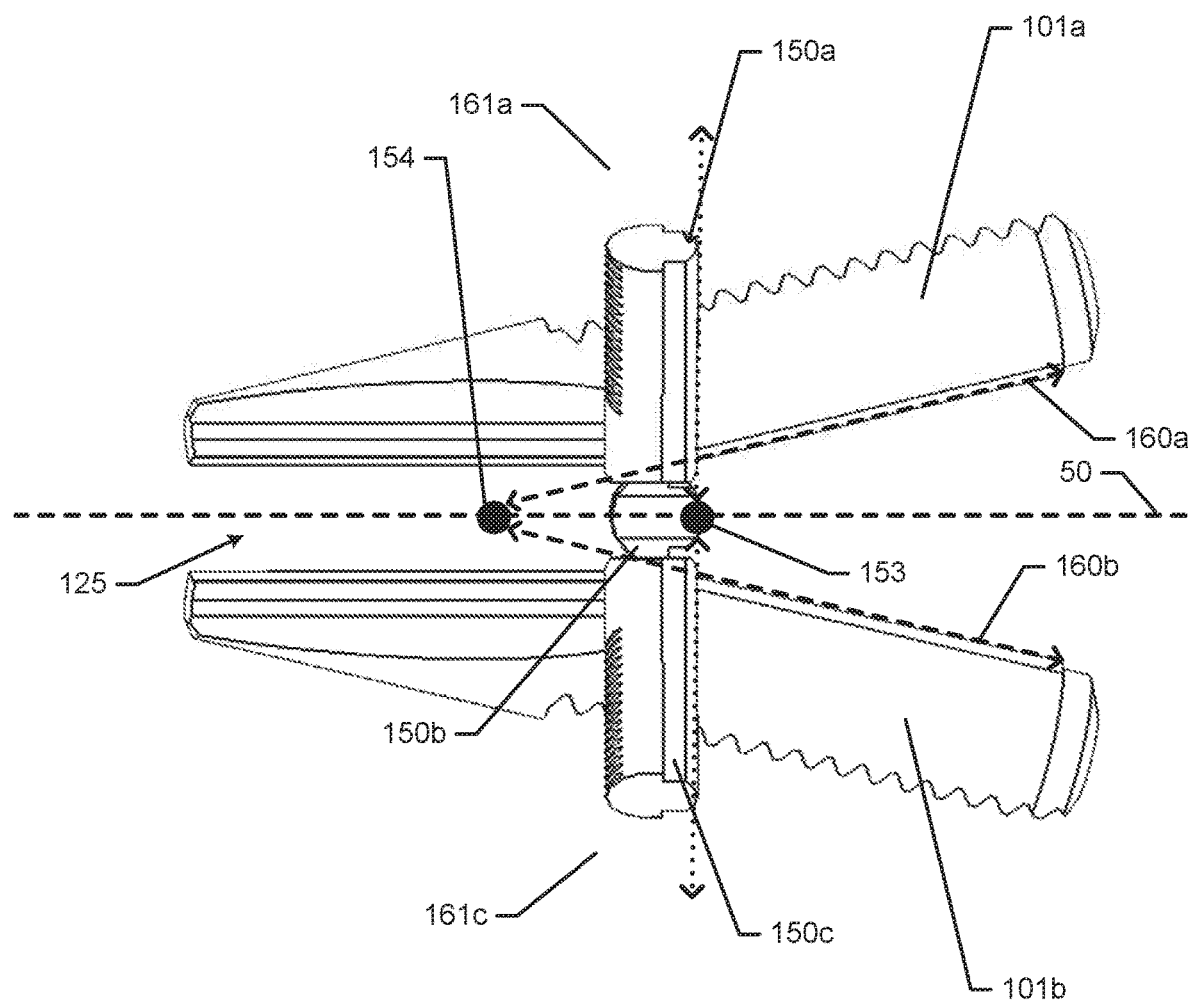
Figure 12:
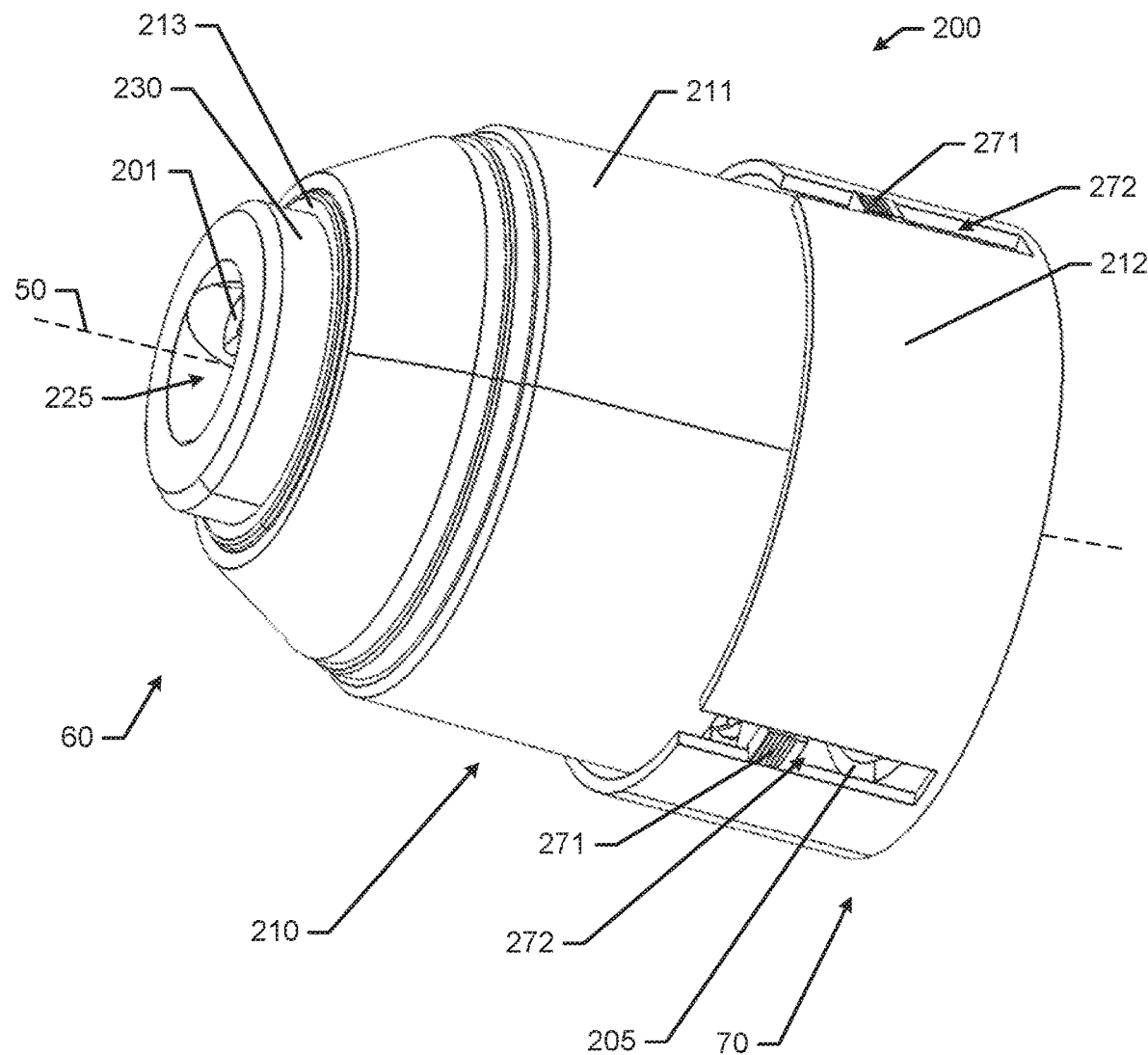
Figure 13:
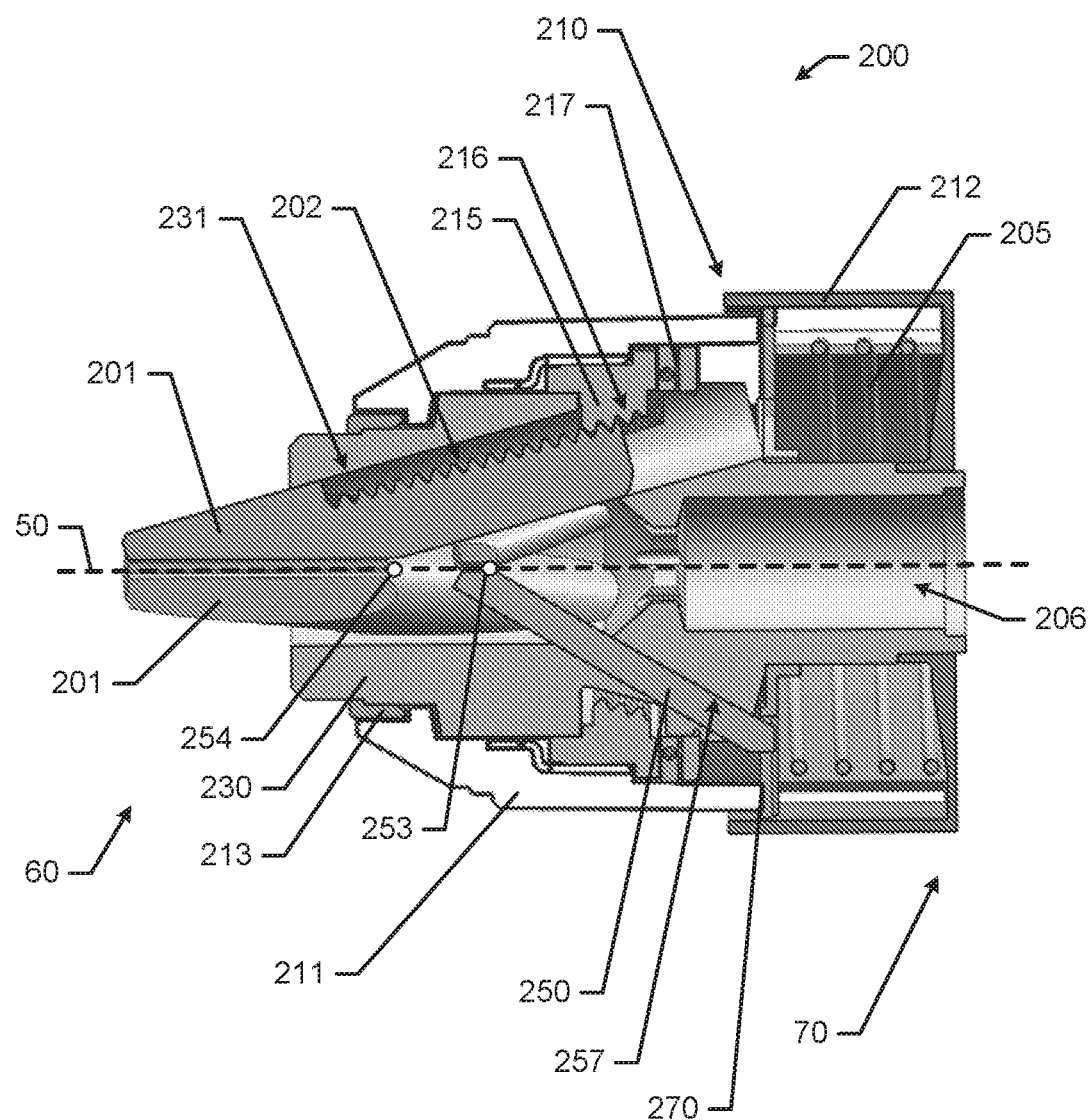
Figure 14:
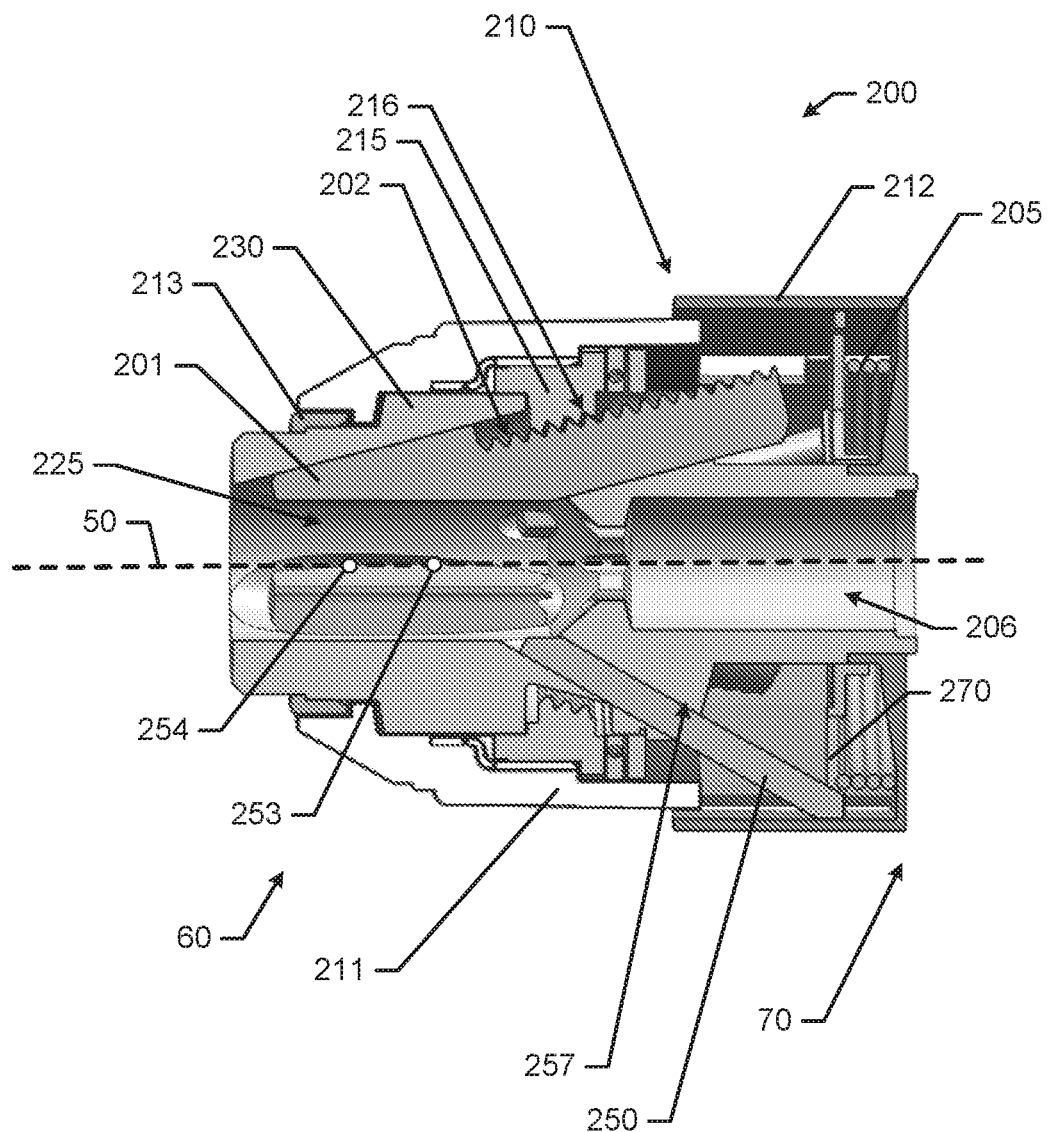
Figure 15:
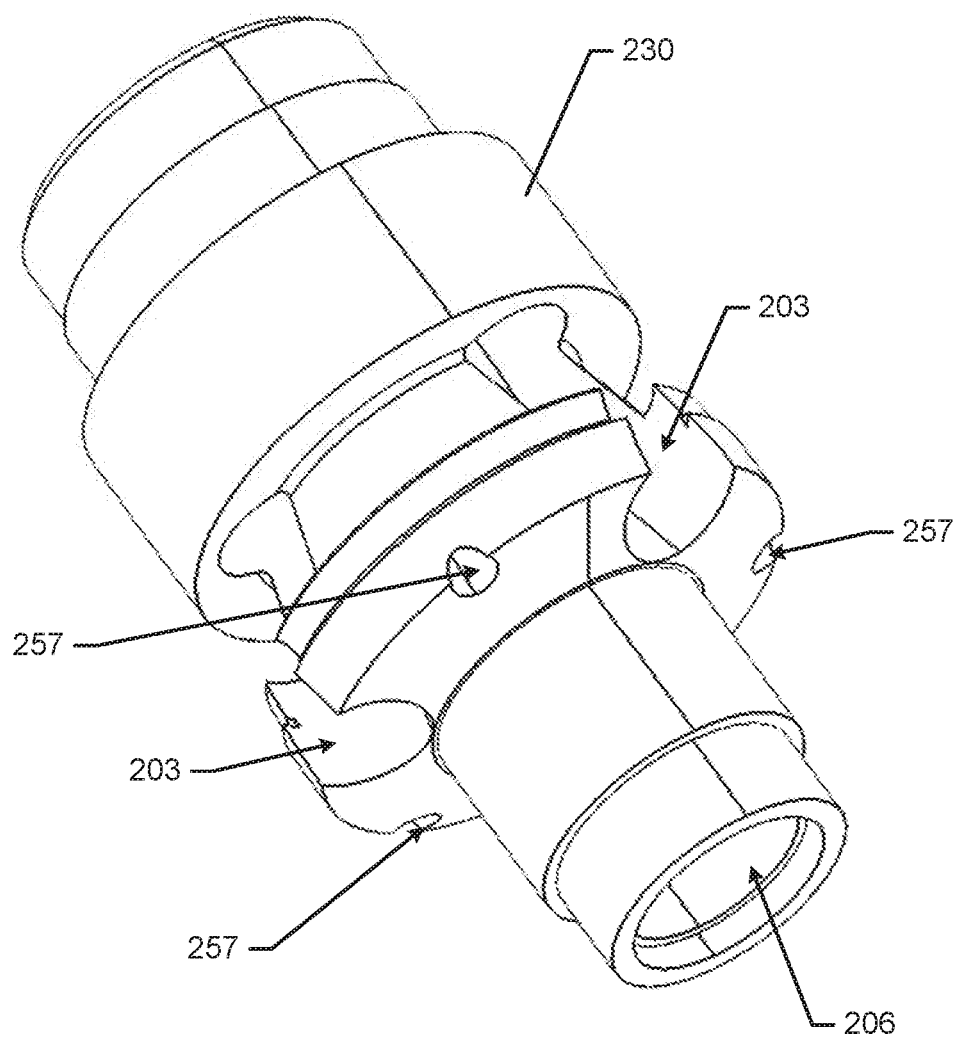
Figure 16:
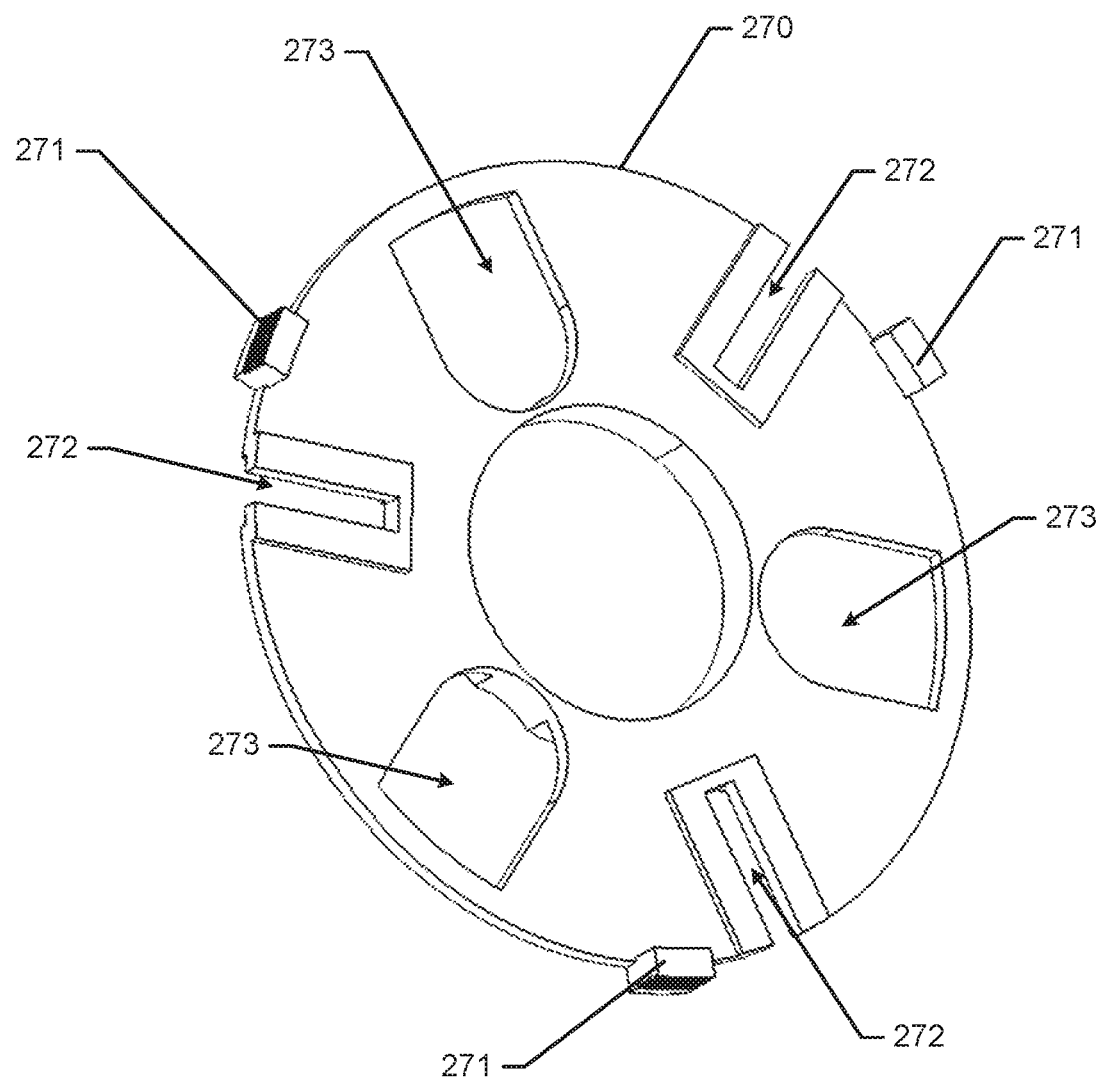
Figure 17:
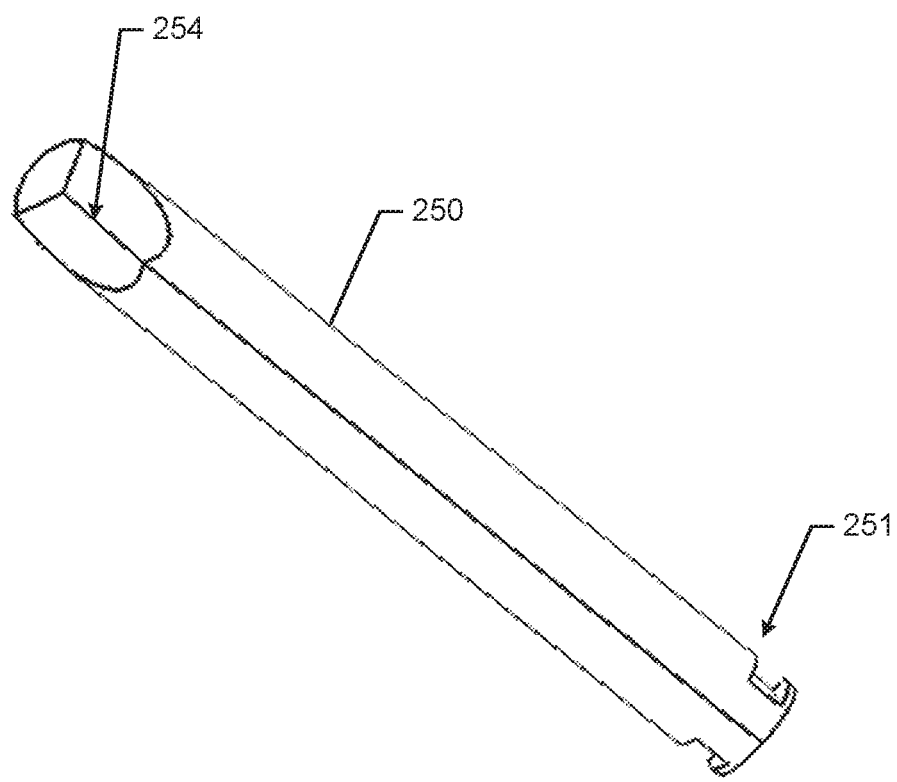
Figure 18:
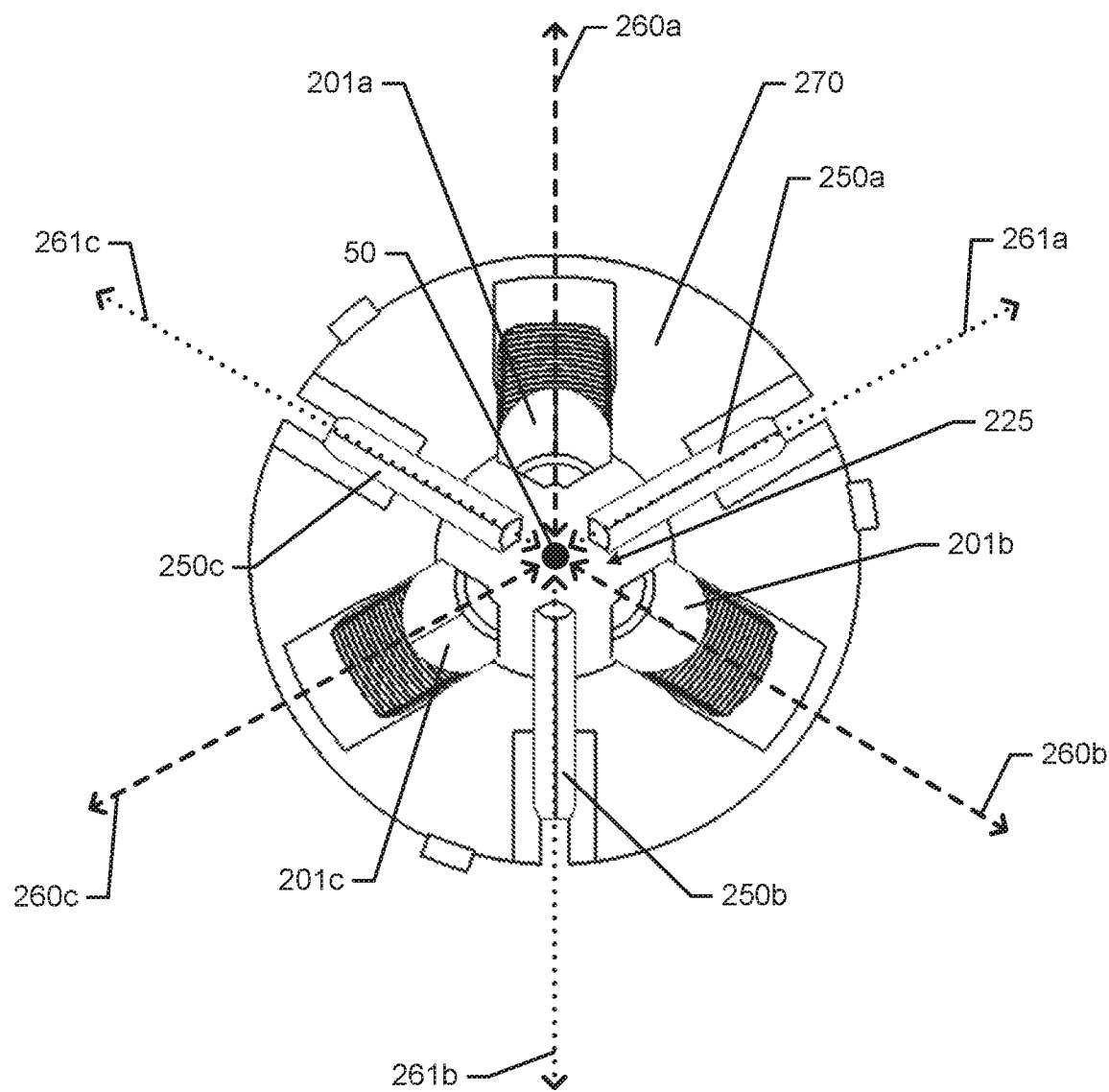
Figure 19:
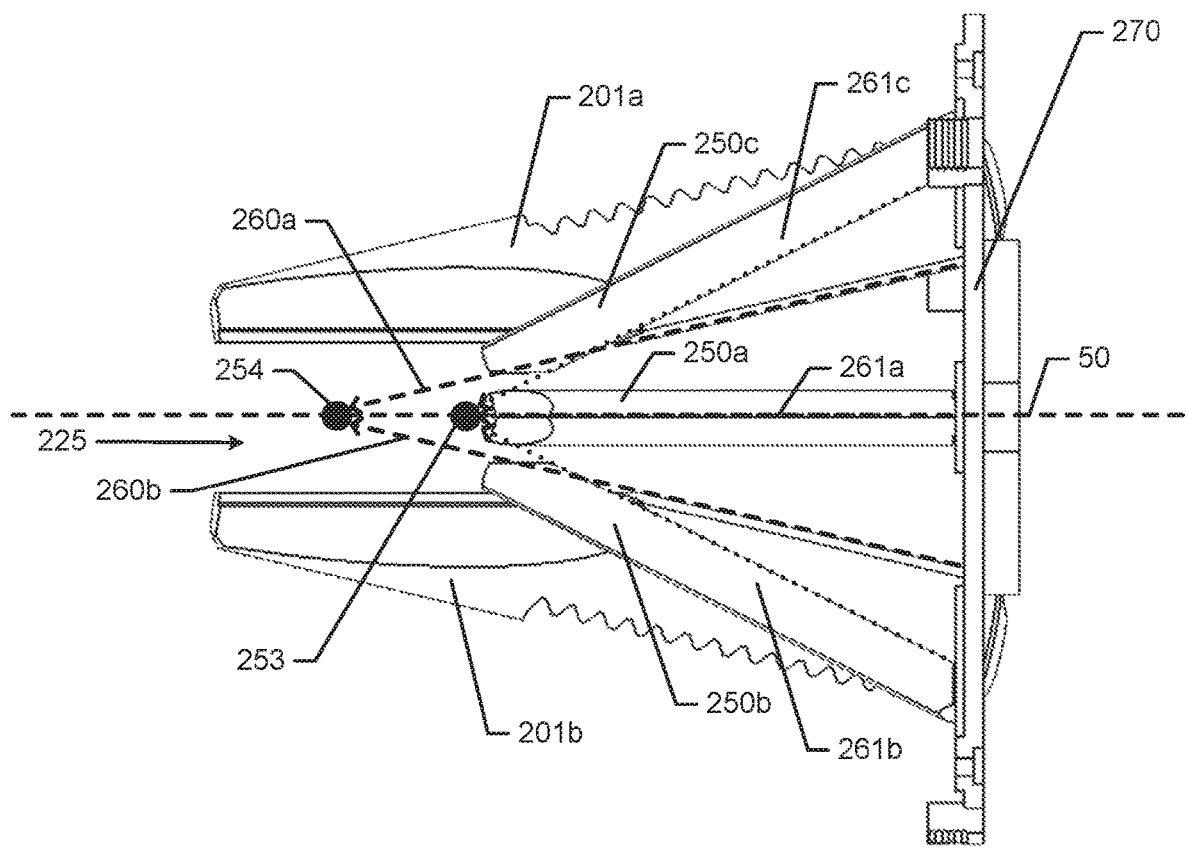

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates a perspective side view of another chuck in accordance with an example embodiment;

FIG. 3 illustrates a cross-section side view of the chuck of FIG. 2 in accordance with an example embodiment;

FIG. 4 illustrates a cross-sectional front view of the chuck of FIG. 2, taken at the plane defined by A-A in FIG. 3, in accordance with an example embodiment;

FIG. 5 illustrates a perspective side view of an example front sleeve component of the chuck of FIG. 2 in isolation in accordance with an example embodiment;

FIG. 6 illustrates a perspective rear view of an example bit alignment jaw nut of the chuck of FIG. 2 in isolation in accordance with an example embodiment;

FIG. 7 illustrates a cross-sectional front view of the chuck of FIG. 2 taken at the plane defined by B-B in FIG. 3 in accordance with an example embodiment;

FIG. 8 illustrates a perspective front view of an example bit alignment jaw of the chuck of FIG. 2 in isolation in accordance with an example embodiment;

FIG. 9 illustrates a magnified cross-section side view of an operable coupling between a bit alignment jaw and the bit alignment jaw nut of the chuck of FIG. 2 in accordance with an example embodiment;

FIG. 10 illustrates a front view of the clamping jaws and bit alignment jaws of the chuck of FIG. 2 with directional movement arrows in accordance with an example embodiment;

FIG. 11 illustrates a side view of select clamping jaws and the bit alignment jaws of the chuck of FIG. 2 with directional movement arrows in accordance with an example embodiment;

FIG. 12 illustrates a perspective side view of another chuck in accordance with an example embodiment;

FIG. 13 illustrates a cross-section side view of the chuck of FIG. 12 with the clamping jaws and the bit alignment jaws in closed positions in accordance with an example embodiment;

FIG. 14 illustrates a cross-section side view of the chuck of FIG. 12 with the clamping jaws and the bit alignment jaws in open positions in accordance with an example embodiment;

FIG. 15 illustrates a perspective side view of an example body of the chuck of FIG. 12 in isolation in accordance with an example embodiment;

FIG. 16 illustrates a perspective front view of an example drive plate of the chuck of FIG. 12 in isolation in accordance with an example embodiment;

FIG. 17 illustrates a perspective side view of an example bit alignment jaw of the chuck of FIG. 12 in isolation in accordance with an example embodiment;

FIG. 18 illustrates a front view of the clamping jaws, bit alignment jaws, and drive plate of the chuck of FIG. 12 with directional movement arrows in accordance with an example embodiment; and FIG. 19 illustrates a side view of select clamping jaws, the bit alignment jaws, and a drive plate of the chuck of FIG. 12 with directional movement arrows in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, a chuck is provided that includes a self-aligning feature that operates when tightening the clamping jaws of the chuck onto a working bit. According to some example embodiments, additional jaws in the form of bit alignment jaws are included in the chuck that operate to maintain the working bit in a central portion of the opening formed by the clamping jaws. These bit alignment jaws may be configured to maintain or hold the working bit in a central or generally central position to ensure that the clamping jaws tighten onto the working bit in a proper central position, and not in a side gap between only two of the clamping jaws. To perform this function, according to some example embodiments, the bit alignment jaws may be disposed in between each of the clamping jaws to fill the gaps between the clamping jaws and thereby prevent the working bit from moving into gaps between the clamping jaws. According to some example embodiments, the bit alignment jaws may be biased and forced to converge together on the working bit in a manner that holds the working bit in a central location and the clamping jaws can then be tightened onto the working bit, thereby preventing the working bit from moving out of the central position and into a gap between the clamping jaws. As such, various example embodiments operate to solve the technical problem of a working bit moving out of alignment with the clamping jaws of a chuck and into a gap between the clamping jaws, where the working bit can be undesirably lodged and misaligned for use. Various example embodiments described herein, operate to address this and other technical problems by employing a chuck design that supports self-alignment of the working bit within the chuck during tightening of the clamping jaws.

In this regard, FIG. 1 illustrates and example chuck 10 according to some example embodiments. The chuck 10 is shown as being physically coupled to a portion of a power driver 20, which may be, for example, a pneumatic or electric powered tool (e.g., a drill) configured to rotate a drive spindle that is operably coupled to the chuck 10 in an opening on a rear side of the chuck 10. The chuck 10 may define a center axis 50 about which the chuck 10 may rotate when in operation due to rotation of the drive spindle of the power driver 20. For orientation purposes, the chuck 10 may have a forward end 60 where a working bit is inserted and clamped into position in a working mode, and a rearward end 70 where the chuck 10 is attachable to or integrated with the drive spindle of the power driver 20. As seen in FIG. 1, the chuck 10 may comprise, among other components, clamping jaws 11, a nose 12, and a sleeve 13. As further described herein, the clamping jaws 11 may be configured to move or translate in a closing or opening direction to change the size of a working bit opening between the forward ends and the clamping portions of the clamping jaws 11. According to some example embodiments, rotation of the sleeve 13 in the sleeve closing direction 14, with the clamping jaws 11 rotationally stationary relative to the sleeve 13, may cause the clamping jaws 11 to translate forward in a closing direction and clamp on to a working bit. Additionally, rotation of the sleeve 13 in a direction opposite of sleeve closing direction 14 (i.e., the sleeve opening direction), with the clamping jaws 11 rotationally stationary relative to the sleeve 13, may cause the clamping jaws 11 to translate rearward in an opening direction to increase the size of the clamping jaw opening. According to some example embodiments, the chuck 10 may include bit alignment jaws, internal to the chuck 10 and not shown in FIG. 1, that operate to maintain a working bit in a substantially central location in the working bit opening formed by the clamping jaws 11 during tightening of the clamping jaws 11 onto the working bit. Further, the power driver housing 21 may be a component of the power driver 20.

FIGS. 2 through 11 illustrate another example chuck 100 and components thereof in various views that are referenced together to facilitate understanding the various example embodiments. In this regard, FIG. 2 provides an external perspective side view of the chuck 100. Additionally, FIG. 3 provides a cross-section side view of the chuck 100, while FIGS. 4 through 11 show various views of the chuck 100 or components thereof. Similar to the above, the chuck 100 may define a center axis 50. For orientation purposes, the chuck 100 may have a forward end 60 and a rearward end 70.

The external, perspective side view of chuck 100 as shown in FIG. 3 illustrates that the chuck 100 may comprise clamping jaws 101, a nose member 113, a dust cover 105, and a sleeve 110. The sleeve 110 may be comprised of a front sleeve 111 and a rear sleeve 112. As mentioned above, the chuck 100, when driven, may rotate about the axis 50.

The cross-section side view of FIG. 3 shows the chuck 100, which may include various components that, for example, operate together to permit the chuck 100 to maintain a working bit in proper alignment for clamping during the jaw tightening and clamping process onto a working bit (not shown) and prevent the working bit from moving into a gap between clamping jaws 101 where the working bit would be misaligned. Among other components, the chuck 100 may include clamping jaws 101, a sleeve 110, a clamping jaw nut 115, a nose member 113, a body 130, bit alignment jaws 150, and a bit alignment jaw nut 155.

The body 130 may be a component of the chuck 100 that is affixed to the drive spindle, via, for example, a rearward facing bore 106, and is configured to transfer the rotation of the drive spindle to the clamping jaws 101 to drive the working bit during working operation of the chuck 100. As shown in FIG. 3, the center axis 50 may also be defined about the body 130, which is also configured to rotate about the center axis 50. The clamping jaws 101 may be disposed such that the clamping jaws 101 extend forward when moved in a closing direction and out of a forward opening in the body 130, which may be encompassed by the nose member 113. The clamping jaws 101 may be operably coupled to the body 130 via jaw passageways 131 in the body 130. Because the clamping jaws 101 are rotationally constrained in the jaw passageways 131, the clamping jaws 101 may rotate with the body 130. However, the clamping jaws 101 may be configured to move or translate relative to the body 130 within the jaw passageways 131 in response to forces applied on the clamping jaws 101 via, for example, the clamping jaw nut 115 to thereby change the diameter of the working bit opening 125. The clamping jaws 101 may include clamping jaw threading 102 on each clamping jaw 101 that may operably couple with clamping jaw nut threading 116 of the clamping jaw nut 115 to facilitate translational movement of clamping jaws 101 in response to rotation of the clamping jaw nut 115 relative to the clamping jaws 101. According to some example embodiments, the chuck 100 may include three clamping jaws 101 and the body 130 may include three associated jaw passageways 131. The jaw passageways 131 may permit the clamping jaws 101 to move rearward into the body 130 (i.e., in a jaw opening direction to increase the diameter of the working bit opening 125) and move forward out of the body 130 (i.e., in a jaw closing direction to reduce the diameter of the working bit opening 125). In this regard, as the clamping jaws 101 translate forward within the passageways 131 in the jaw closing direction, the clamping jaws 101 may translate along a respective angle (e.g., an acute angle) relative to the center axis 50 such that the clamping jaws 101 decrease the diameter of the working bit opening 125 and meet or converge at a clamping jaw point of convergence 154 on the center axis 50. Similarly, as the clamping jaws 101 translate rearward within the passageways 131 in the jaw opening direction, the clamping jaws 101 may move along the respective angles relative to the center axis 50 such that the clamping jaws 101 move away from the clamping jaw point of convergence 154 and increase the diameter of the working bit opening 125. Via this translational, angular movement, adjustability is provided such that the clamping jaws 101 may engage various working bits having different sized shafts.

A sleeve 110 may be disposed externally on the chuck 100 and may take the form of an open cylinder, which may be tapered at the forward end, with at least some of the components of the chuck 100 being disposed within a cavity of the sleeve 110. The sleeve 110 may be a single component or comprised of multiple components in the form of, for example, a front sleeve 111 and a rear sleeve 112. According to some example embodiments, the front sleeve 111 may be affixed to or integrated with the rear sleeve 112. According to some example embodiments, the front sleeve 111 may be press fit into an interference engagement with the rear sleeve 112, thereby forming the sleeve 110, such that the front sleeve 111 and the rear sleeve 112 rotate together. According to some example embodiments, the sleeve 110 may operate as a component of a user interface to the chuck 100 to control various functionalities including opening and closing of the clamping jaws 101. The sleeve 110 may be configured to rotate about the center axis 50 relative to the body 130 and the clamping jaws 101 and, due to an operable coupling to the clamping jaws 101, cause the clamping jaws 101 to move in either the opening or closing direction based on the direction of rotation of the sleeve 110. As such, the sleeve 110 may be configured to rotate relative to the clamping jaws 101 and the body 130, to tighten the clamping jaws 101 until the clamping jaws 101 are clamped onto the working bit.

The sleeve 112 may operate to move a clamping jaw nut 115 of the chuck 100, via engagement between the sleeve 112 and the clamping jaw nut 115. According to some example embodiments, the clamping jaw nut 115 may be affixed to the sleeve 112 via, for example, an interference fit between the clamping jaw nut 115 and the sleeve 112. Due to an engagement between the clamping jaw nut threading 116 and the clamping jaw threading 102, rotation of the clamping jaw nut 115 may cause translational movement of the clamping jaws 101 within the body 130. In this regard, the clamping jaw nut 115 may include clamping jaw nut thread 116 that operably couples to clamping jaw thread 102 in a helically threaded coupling. A helically threaded coupling is one where at least one of the sets of threads are helically engaged with a slope in order to convert rotational movement into translational movement. As such, when the clamping jaw nut 115 is turned relative to the clamping jaws 101, the clamping jaws 101 may translate in either opening or closing direction. Such relative movement of the clamping jaw nut 115 to the clamping jaws 101 may occur when the sleeve 110 is turned by a user.

Accordingly, rotation of the sleeve 110 may cause the clamping jaw nut 115 to also rotate, thereby causing the clamping jaws 101 to translate towards or away from the clamping jaw point of convergence 154. According to some example embodiments, rotation of the sleeve 110 may also cause bit alignment jaws 150 to translate towards or away from a bit alignment jaw point of convergence 153. The bit alignment jaw point of convergence 153 may be located on the center axis 50 at a position rearward of the clamping jaw point of convergence 154. According to some example embodiments, a point of convergence may be defined as, for example, the most rearward point where, if the movement of the jaws (e.g., clamping jaws 101 or bit alignment jaws 150) continued, the jaws would either actually converge if permitted to physically engage each other or engage a working bit on a working bit engaging face of the jaws. As such, a direction vector may be defined based on the direction of movement of each jaw and a most rearward point on the working bit engaging face of the jaw. The point of convergence may therefore be the point whether the direction vector intersects the center axis 50.

The bit alignment jaws 150 may also be disposed in bit alignment jaw passageways 157 in the body 130 and may be configured to translate within the bit alignment jaw passageways 157. Additionally, the bit alignment jaws 150 may be operably coupled to a guide ring 152 that also operates to facilitate the translational movement of the bit alignment jaws 150. According to some example embodiments, the bit alignment jaws 150 may also be configured to translate into and out of the working bit opening 125 formed by the clamping jaws 101 to maintain the working bit in a generally central location during closing of the clamping jaws 101 to avoid misalignment of a working bit. In this regard, the bit alignment jaws 150 may be disposed in between each of the clamping jaws 101 and may therefore fill at least a portion of the gaps formed between the clamping jaws 101. As such, according to some example embodiments, each bit alignment jaw 150 may be disposed between two clamping jaws 101 and may therefore be configured to translate into the working bit opening 125 between the two clamping jaws 101. In this regard, translation of the bit alignment jaws 150 may occur such that the working bit engaging face 157 of the bit alignment jaws 150 is positioned to define the working bit opening 125 together with the clamping jaws 101. According to some example embodiments, the bit alignment jaws 150 may be configured to translate in unison or synchronously with the translation of the clamping jaws 101. The bit alignment jaws 150 may be configured to physically engage the working bit at a position rearward of the where the clamping jaws 101 would physically engage a working bit. According to some example embodiments, the direction of motion for the bit alignment jaws 150 may be substantially perpendicular to center axis 50.

The bit alignment jaws 150 may also include bit alignment jaw threading 151 on a forward facing side of the bit alignment jaws 150. Further, the chuck 100 may include a bit alignment jaw nut 155 having bit alignment jaw nut thread 156. The bit alignment jaw nut thread 156 may operably couple in a helical threaded engagement with the bit alignment jaw threads 151 on the bit alignment jaws 150. According to some example embodiments, the bit alignment nut 155 may be formed as, or comprise, a bit alignment plate or ring as shown in FIG. 6, and the bit alignment jaw nut thread 156 may be disposed on a rearward face of the bit alignment plate. Due to the operably coupling between the bit alignment jaw nut 155 and the bit alignment jaws 150, and more particularly the operably coupling between the bit alignment jaw nut threading 156 and the bit alignment jaw threading 151, rotation of the bit alignment jaw nut 155 may cause translation of the bit alignment jaws 150 towards or away from the bit alignment jaw point of convergence 153. Further, the bit alignment jaw nut 155 may be operably coupled to the sleeve 110 (e.g., via the front sleeve 111 as shown in FIG. 3). As such, when the sleeve 110 is rotated both the bit alignment jaw nut 155 and clamping jaw nut 115 may be synchronously rotated thereby causing both the bit alignment jaws 150 and the clamping jaws 101 to move synchronously to form the working bit opening 125.

FIG. 4 shows a cross-sectional front view of the chuck 100 taken at the plane defined by A-A in FIG. 3. As shown in FIG. 4, the bit alignment jaws 150 may be disposed in between the clamping jaws 101 and the clamping jaw passageways 131 in the body 130. In this regard, according to some example embodiments, the bit alignment jaws 150 may be separated around the center axis 50 by angles of 120 degrees or about 120 degrees due to the implementation of three bit alignment jaws 150.

FIG. 5 shows the front sleeve 111 and detail of an interior cavity 114 of the front sleeve 111, according to some example embodiments. In this regard, the front sleeve 111 may include drive lugs 109 disposed in the internal cavity 114 of the front sleeve 111. The drive lugs 109 may be protrusions into the cavity 114 that may be configured to couple with notches 158 in the bit alignment jaw nut 155.

As shown in FIG. 6, the bit alignment jaw nut 155 may be formed as a bit alignment plate with an interior opening or a ring. The bit alignment jaw nut 155 may also include circumferential notches 158 that are configured to operably couple with drive lugs 109 of the front sleeve 111. Via the operable coupling between the front sleeve 111 and the bit alignment jaw nut 155, rotation of the front sleeve 111, for example, by a user, would in turn cause the bit alignment jaw nut 155 to rotate. The rotation of the bit alignment jaw nut 155 would in turn cause the bit alignment jaws 150 to translate due to the operable coupling with bit alignment jaw nut thread 156. Referring to FIG. 7, which is taken at the plane B-B of the chuck 100 as shown in FIG. 3, the operable coupling between the front sleeve 111 and the bit alignment jaw nut 155 can be seen.

FIG. 8 shows a bit alignment jaw 150, according to some example embodiments. In this regard, the bit alignment jaw 150 may include bit alignment jaw thread 151. Further, the bit alignment jaw 150 may be keyed to assist with both assembly and operation of the chuck 100. In this regard, the bit alignment jaw 150 may include notches 153 which may be configured to operably couple with complementary slots on the guide ring 152. Additionally, the bit alignment jaws 150 may include a working bit engagement face 159 that may directly and physically engage with a working bit. Further, a most rearward point 154 on the working bit engagement face 159, for use in identifying the bit alignment jaw point of convergence is also shown.

FIG. 9 illustrates a magnified view of the operable coupling between a bit alignment jaw 150 and the bit alignment jaw nut 155. In this regard, the bit alignment jaw nut thread 156 is shown as being physically engaged with the bit alignment jaw thread 151. Accordingly, as the bit alignment jaw nut 155 is rotated the bit alignment jaw 150 is moved inward towards the center axis 50 or outward away from the center axis 50 as indicated by the directional movement arrow 158.

FIG. 10 shows a front view of the jaws of the chuck 100, as oriented in the assembly of the chuck 100, however, with all other components removed. Accordingly, the view point is along the center axis 50 which is indicated as the central point. As shown, each jaw is indicated with an associated directional movement arrow. In this regard, clamping jaw 101a translates in accordance with directional movement arrow 160a, clamping jaw 101b translates in accordance with directional movement arrow 160b, and clamping jaw 101c translates in accordance with directional movement arrow 160c. Further, directional movement arrows 160a, 160b, and 160c may be oriented 120 degrees apart due to the chuck 100 having three clamping jaws 101a, 101b, and 101c. Similarly, the bit alignment jaw 150a translates in accordance with directional movement arrow 161a, bit alignment jaw 150b translates in accordance with directional movement arrow 161b, and bit alignment jaw 150c translates in accordance with directional movement arrow 161c. Further, directional movement arrows 161a, 161b, and 161c may be oriented 120 degrees apart due to the chuck 100 having three bit alignment jaws 150a, 150b, and 150c. As can be seen best in FIG. 10, movement of both the clamping jaws 101 and the bit alignment jaws 150 is directed towards or away from the center axis 50 of the chuck 100.

FIG. 11 shows a side view of select jaws of the chuck 100, as oriented in the assembly of the chuck 100, however, with all other components of the chuck 100 removed. Additionally, one of the clamping jaws 101 are removed from FIG. 11 to avoid obstructing a view of the spatial relationships between the jaws within the chuck 100 relative to center axis 50. As shown in FIG. 11, the clamping jaw point of convergence 154 and the bit alignment jaw point of convergence 153 is provided with the directional movement arrows also shown in FIG. 10. As shown, each jaw is again indicated with an associated directional movement arrow. In this regard, clamping jaw 101a translates in accordance with directional movement arrow 160a, and clamping jaw 101b translates in accordance with directional movement arrow 160b. Clamping jaw 101c is not shown. The clamping jaws 101 therefore translate at acute angles to the center axis 50. Again, the bit alignment jaw 150a translates in accordance with directional movement arrow 161a, bit alignment jaw 150b translates in accordance with directional movement arrow 161b, and bit alignment jaw 150c translates in accordance with directional movement arrow 161c. According to some example embodiments, the bit alignment jaws 150 may translate at a 90 degree angle or perpendicular to the center axis 50. Further, as best seen in FIG. 11, the clamping jaws 101 may translate towards or away from the clamping jaw point of convergence 154 that is disposed on the center axis 50. Similarly, the bit alignment jaws 150 may translate towards or away from the bit alignment jaw point of convergence 153 that is disposed on the center axis 50. Further, as best seen in FIG. 11, the clamping jaw point of convergence 154 may be disposed rearward of the bit alignment jaw point of convergence 153.

FIGS. 12 through 19 illustrate another example chuck 200, according to some example embodiments, and components thereof in various views that are referenced together to facilitate understanding various example embodiments. In this regard, FIG. 12 provides an external perspective side view of the chuck 200. Additionally, FIGS. 13 and 14 provide cross-section side views of the chuck 200 as assembled, while FIGS. 15 through 19 show various views of the chuck 200 disassembled or isolated components of the chuck 200 in various orientations. Similar to the above, the chuck 200 may define a center axis 50. For orientation purposes, the chuck 200 may have a forward end 60 and a rearward end 70.

The external, perspective side view of chuck 200 as shown in FIG. 12 illustrates that the chuck 200 may comprise clamping jaws 201, a body 230, and a sleeve 210. The sleeve 210 may be comprised of a front sleeve 211 and a rear sleeve 212. As mentioned above, the chuck 200, when driven, may rotate about the axis 50.

The cross-section side view of FIGS. 13 and 14 show the chuck 200, which may include various components that, for example, operate together to permit the chuck 200 to maintain a working bit in proper alignment for clamping during the jaw tightening and clamping process onto a working bit (not shown) and not permit the working bit move into a gap between clamping jaws 101 where the working bit would be misaligned. In this regard, FIG. 13 shows the chuck 200 with the clamping jaws 201 in a closed or clamped position (i.e., where the working bit opening 225 is closed) and the bit alignment jaws 250 also in a closed position due to drive plate 270 being urged by the drive spring 205 into a forward position. FIG. 14 shows the chuck 200 with the clamping jaws 201 in an open position (i.e., where the working bit opening 225 is open) and the bit alignment jaws 250 also in an open position due to drive plate 270 being forced into a forward position against the urging of the drive spring 205. Among other components, the chuck 200 may include clamping jaws 201, a front sleeve 211, rear sleeve 212, a clamping jaw nut 215, a nose member 213, a body 230, bit alignment jaws 250, drive plate 270, and drive spring 205.

The body 230 may be a component of the chuck 200 that is affixed to the drive spindle, via, for example, a rearward facing bore 206, and is configured to transfer the rotation of the drive spindle to the clamping jaws 201 to drive the working bit during working operation of the chuck 200. The clamping jaws 201 may be disposed such that the clamping jaws 201 may extend forward when moved in a closing direction and out of a forward opening in the body 230, which may be encompassed by the nose member 213. The clamping jaws 201 may be operably coupled to the body 230 via jaw passageways 231 in the body 230. Because the clamping jaws 201 are rotationally constrained in the jaw passageways 231, the clamping jaws 201 may rotate with the body 230. However, the clamping jaws 201 may be configured to move or translate relative to the body 230 within the jaw passageways 231 in response to forces applied on the clamping jaws 201 via, for example, the clamping jaw nut 215 to thereby change the diameter of the working bit opening 225. The clamping jaws 201 may include clamping jaw threading 202 on each clamping jaw 201 that may operably couple with clamping jaw nut threading 216 of the clamping jaw nut 215 to facilitate translational movement of clamping jaws 201 in response to rotation of the clamping jaw nut 215. According to some example embodiments, the chuck 200 may include three clamping jaws 201 and the body 230 may include three associated jaw passageways 231. The jaw passageways 231 may permit the clamping jaws 201 to move rearward into the body 230 (i.e., in a jaw opening direction to increase the diameter of the working bit opening 225) and move forward out of the body 230 (i.e., in a jaw closing direction to reduce the diameter of the working bit opening 225). In this regard, as the clamping jaws 201 translate forward within the passageways 231 in the jaw closing direction, the clamping jaws 201 may translate along a respective angle (e.g., an acute angle) relative to the center axis 50 such that the clamping jaws 201 decrease the diameter of the working bit opening 225 and meet or converge at a clamping jaw point of convergence 254 on the center axis 50. Similarly, as the clamping jaws 201 translate rearward within the passageways 231 in the jaw opening direction, the clamping jaws 201 may move along the respective angles relative to the center axis 50 such that the clamping jaws 201 move away from the clamping jaw point of convergence 254 and increase the diameter of the working bit opening 225. Via this jaw translational angular movement, adjustability is provided such that the clamping jaws 201 may engage various working bits having different sized shafts.

A sleeve 210 may be disposed externally on the chuck 200. According to some example embodiments, the sleeve 210 may be comprised of a front sleeve 211 and a rear sleeve 212 that together may be configured to provide an external covering for some components of the chuck 200, but may offer diverse functionalities. The front sleeve 211 may take the form of an open cylinder, which may be tapered at the forward end, with at least some of the components of the chuck 200 being disposed within a cavity of the front sleeve 211. According to some example embodiments, the front sleeve 211 may be affixed to or integrated with the rear sleeve 212, or the front sleeve 211 and the rear sleeve 212 may be separated. According to some example embodiments, the front sleeve 211 may be press fit into an interference engagement with the rear sleeve 212, thereby forming the sleeve 210, such that the front sleeve 211 and the rear sleeve 212 rotate together. However, according to some example embodiments, the front sleeve 211 and the rear sleeve 212 may be operably coupled together in a manner that permits the front sleeve 211 to rotate relative to the rear sleeve 212. According to some example embodiments, the front sleeve 211 may operate as a component of a user interface to the chuck 200 to control various functionalities including opening and closing of the clamping jaws 201. The front sleeve 211 may be configured to rotate about the center axis 50 relative to the body 230 and the clamping jaws 201 to cause the clamping jaws 201 to translate in either the opening or closing direction based on the direction of rotation of the front sleeve 211. As such, the front sleeve 211 may be configured to rotate relative to the clamping jaws 201 and the body 230, to tighten the clamping jaws 201 until the clamping jaws 201 are clamped onto the working bit.

The front sleeve 211 may operate to move a clamping jaw nut 215 of the chuck 200, via engagement between the front sleeve 211 and the clamping jaw nut 215. According to some example embodiments, the clamping jaw nut 215 may be affixed to the front sleeve 210 via, for example, an interference fit between the clamping jaw nut 215 and the sleeve 210. Due to an engagement between the clamping jaw nut threading 216 and the clamping jaw threading 202, rotation of the clamping jaw nut 215 may cause translational movement of the clamping jaws 201 within the body 230. In this regard, the clamping jaw nut 215 may include clamping jaw nut thread 216 that operably couples to clamping jaw thread 202 in a helically threaded coupling. A helically threaded coupling is one where at least one of the sets of threads are helically engaged with a slope in order to convert rotational movement into translational movement. As such, when the clamping jaw nut 215 is turned relative to the clamping jaws 201, the clamping jaws 201 may translate in either an opening or closing direction. Such relative movement of the clamping jaw nut 215 to the clamping jaws 201 may occur when the sleeve 210 is turned by a user.

Accordingly, rotation of the front sleeve 211 may cause the clamping jaw nut 215 to also rotate, thereby causing the clamping jaws 201 to translate towards or away from the clamping jaw point of convergence 254. As further described below, translation of the bit alignment jaws 250 may be directed either towards or away from a bit alignment jaw point of convergence 253. The bit alignment jaw point of convergence 253 may be located on the center axis 50 at a position rearward of the clamping jaw point of convergence 254. According to some example embodiments, a point of convergence may be defined as, for example, the most rearward point where, if the movement of the jaws (e.g., clamping jaws 201 or bit alignment jaws 250) continued, the jaws would either actually converge if permitted to physically engage each other or engage a working bit on a working bit engaging face of the jaws. As such, a direction vector may be defined based on the direction of movement of each jaw and a most rearward point on the working bit engaging face of the jaw. The point of convergence may therefore be the point whether the direction vector intersects the center axis 50.

The bit alignment jaws 250 of the chuck 200 may be configured to maintain a working bit in a generally central location within the working bit opening 225 while the clamping jaws 201 are being tightened onto the working bit. In this regard, the bit alignment jaws 250 may be spring-loaded such that the bit alignment jaws 250 are urged into a closed position where the bit alignment jaws 250 hold the working bit in place. As such, the bit alignment jaws 250 may operate to prevent the working bit form moving out of alignment and in between a gap formed between two of the clamping jaws 201.

The bit alignment jaws 250 may also be disposed in bit alignment jaw passageways 257 in the body 230 and may be configured to translate within the bit alignment jaw passageways 257 as seen in FIG. 15. In this regard, FIG. 15 provides and isolated view of the body 230 and the rear openings to the jaw passageways. According to some example embodiments, the bit alignment jaws 250 may also be configured to translate into and out of the working bit opening 225 formed by the clamping jaws 201 via the bit alignment jaw passageways 257.

The bit alignment jaws 250 may be configured to translate independent of the movement of the clamping jaws 201. As such, according to some example embodiments, rotation of the front sleeve 211 may have no effect on the movement of the bit alignment jaws 250. Rather, according to some example embodiments, the bit alignment jaws 250 may be operably coupled to a drive plate 270, and movement of the drive plate 270 may cause translational movement of the bit alignment jaws 250. In this regard, the drive plate 270 may be subjected to a spring force applied by the drive spring 205, which may be disposed between a rear inner wall of the rear sleeve 212 and the drive plate 270. The drive spring 205 may be configured to urge the drive plate 270 in a forward direction which may cause the bit alignment jaws 250 to translate into a closed position towards a bit alignment jaw point of convergence 253 as shown in FIG. 13.

However, according to some example embodiments, the drive plate 270 may also include one or more external adjustment controls 271, which may be one or more protrusions or tabs coupled to the drive plate 270 that are accessible to a user through a slot 272 in the rear sleeve 211. The external adjustment controls 271 can be interfaced with by a user (e.g., by pulling the external adjustment controls 271 to displace the drive plate 270 in a rearward direction) to cause movement of the drive plate 270 and the bit alignment jaws 250. In this regard, a user may pull or otherwise translate the external adjustment controls 271 in a rearward direction to move the drive plate 270 rearward against the force exerted on the drive plate 270 by the drive spring 205. As the drive plate 270 is moved in the rearward direction, the bit alignment jaws 250 may be caused to translate rearward in an opening direction to open the bit alignment jaws 250 as shown in FIG. 14. With the bit alignment jaws 250 open and the clamping jaws 201 sufficiently open to receive the working bit, a user may place a working bit into the working bit opening 225 and then permit the bit alignment jaws 250 to close by releasing the external adjustment controls 271 and allowing the drive plate 270 move forward and close the bit alignment jaws 250 onto the working bit due to the force exerted on the drive plate 270 by the drive spring 205. The bit alignment jaws 250 may be configured to physically engage the working bit at a position rearward of the where the clamping jaws 201 would physically engage a working bit. With the working bit being held in position by the bit alignment jaws 250, the user may then rotate the front sleeve 211 in a closing direction to cause the clamping jaws 201 to translate towards the working bit and the clamping jaws point of convergence 254.

According to some example embodiments, the external adjustment controls 271 may be implemented in a number of other ways. For example, according to some example embodiments, the front sleeve 211 may embody the external adjustment control 271. In this regard, the front sleeve 211 may be operably coupled with (e.g., affixed to, integrated with, etc.) the drive plate 270 and may be permitted to translate forward and rearward into the cavity of the rear sleeve 212. Via this operable coupling, as a user pulls or otherwise translates the front sleeve 211 in the rearward direction, the drive plate 270 may also be moved in the rearward direction due to the operable coupling and therefore the bit alignment jaws 250 may be forced open.

Alternatively, according to some example embodiments, the rear sleeve 212 may embody the external adjustment control 271. In this regard, the rear sleeve 212 may be operably coupled with (e.g., affixed to, integrated with, etc.) the drive plate 270. Further, for example, the rear wall of the rear sleeve 212 may be a separate component (e.g., a dust cover) that may be affixed to or integrated with the body 230 at the rear end 70 of the chuck 200. The drive spring 205 may therefore be disposed between the separate rear wall (e.g., dust cover) and the drive plate 270. Because the separate rear wall may not translate relative to the body 230, the drive spring 205 may leverage the separate rear wall and urge the drive plate 270 forward to close the bit alignment jaws 250. Accordingly, a user may therefore be permitted to translate the rear sleeve 212 rearward to move the drive plate 270 rearward to open the bit alignment jaws 250.

FIG. 16 shows an isolated view of the drive plate 270. The drive plate 270 may include slots 272 within which the bit alignment jaws 250 may be disposed. In this regard, with reference to FIG. 17, the bit alignment jaws 250 may include a notched base 251 that slides into the slot 272 of the drive plate 270. The notched base 251 and the slot 272 may operate together to permit the notched base 251 to move within the slot 272 thereby allowing the bases of each of the bit alignment jaws 250 to slide either inward toward the center axis 50 or away from the center axis 50. The drive plate 270 also includes openings 273, which according to some example embodiments, may be configured to receive at least a rear portion of the clamping jaws 201 when the drive plate 270 is in the forward position. In addition to the notched base 251, the bit alignment jaws 250 may also include a working bit engagement face 254 as shown in FIG. 17.

FIG. 18 shows a front view of the jaws of the chuck 200 with the drive plate 270, as oriented in the assembly of the chuck 200, however, with all other components removed. Accordingly, the view point is along the center axis 50 which is indicated as the central point. As shown, each jaw is indicated with an associated directional movement arrow. In this regard, clamping jaw 201a translates in accordance with directional movement arrow 260a, clamping jaw 201b translates in accordance with directional movement arrow 260b, and clamping jaw 201c translates in accordance with directional movement arrow 260c. Further, directional movement arrows 260a, 260b, and 260c may be oriented 120 degrees apart due to the chuck 200 having three clamping jaws 201a, 201b, and 201c. Similarly, the bit alignment jaw 250a translates in accordance with directional movement arrow 261a, bit alignment jaw 250b translates in accordance with directional movement arrow 261b, and bit alignment jaw 250c translates in accordance with directional movement arrow 261c. Further, directional movement arrows 261a, 261b, and 261c may be oriented 120 degrees apart due to the chuck 200 having three bit alignment jaws 250a, 250b, and 250c. As can be seen best in FIG. 18, movement of both the clamping jaws 201 and the bit alignment jaws 250 is directed towards or away from the center axis 50 of the chuck 200.

FIG. 19 shows a side view of select jaws of the chuck 200, as oriented in the assembly of the chuck 200, however, with all other components removed. Additionally, one of the clamping jaws 201 has been removed from FIG. 19 to avoid obstructing a view of the spatial relationships between the jaws within the chuck 200 relative to center axis 50. As shown in FIG. 19, the clamping jaw point of convergence 254 and the bit alignment jaw point of convergence 253 is provided with the directional movement arrows also shown in FIG. 19. As shown, each jaw is again indicated with an associated directional movement arrow. In this regard, clamping jaw 201a translates in accordance with directional movement arrow 260a, and clamping jaw 201b translates in accordance with directional movement arrow 260b. Clamping jaw 201c is not shown. The clamping jaws 201 and bit alignment jaws 250 therefore translate at acute angles to the center axis 50 as best seen in FIG. 19. Again, the bit alignment jaw 250a translates in accordance with directional movement arrow 261a, bit alignment jaw 250b translates in accordance with directional movement arrow 261b, and bit alignment jaw 250c translates in accordance with directional movement arrow 261c.

According to some example embodiments, the bit alignment jaws 250 may translate at acute angles to the center axis 50. Further, as best seen in FIG. 19, the clamping jaws 201 may translate towards or away from the clamping jaw point of convergence 254 that is disposed on the center axis 50. Similarly, the bit alignment jaws 250 may translate towards or away from the bit alignment jaw point of convergence 253 that is disposed on the center axis 50. Further, as best seen in FIG. 19, the clamping jaw point of convergence 254 may be disposed rearward of the bit alignment jaw point of convergence 253.

In view of the forgoing, according to some example embodiments, an example chuck is provided that may be configured to be operably coupled to a power driver having a rotatable drive spindle. The example chuck may comprise a body having a center axis about which the body rotates and a plurality of clamping jaws configured to clamp onto a working bit. The clamping jaws may be configured to angularly translate relative to the center axis within clamping jaw passageways of the body towards or away from a clamping jaw point of convergence to close or open a working bit opening defined by the clamping jaws. The clamping jaw point of convergence may be on the center axis. Further, the example chuck may comprise a plurality of bit alignment jaws. The bit alignment jaws may be configured to maintain the working bit within the working bit opening by being configured translate towards or away from a bit alignment jaw point of convergence that is on the center axis and disposed rearward of the clamping jaw point of convergence.

Additionally, according to some example embodiments, each bit alignment jaw of the example chuck may be disposed between two clamping jaws. Additionally or alternatively, each bit alignment jaw may be configured to translate into the working bit opening in between two clamping jaws. Additionally or alternatively, the example chuck may further comprise a sleeve that is externally disposed and configured to rotate relative to the body. In this regard, The sleeve may be operably coupled to the clamping jaws and the bit alignment jaws to cause the clamping jaws and the bit alignment jaws to synchronously translate in response to rotation of the sleeve. Additionally or alternatively, each bit alignment jaw may include bit alignment jaw threading, and the example chuck may further comprise a bit alignment jaw nut having bit alignment jaw nut threading that engages with the bit alignment jaw threading such that rotation of the bit alignment jaw nut causes translation of the bit alignment jaws. Additionally, the bit alignment nut may comprise a bit alignment plate having the bit alignment nut threading disposed on a face of the bit alignment plate. Additionally or alternatively, the example chuck may further comprise a drive plate and a drive spring. In this regard, the bit alignment jaws may be operably coupled to drive plate, and the drive spring may be configured to urge the drive plate in a forward direction and cause the bit alignment jaws to translate in a closing direction toward the bit alignment jaw point of convergence. Additionally or alternatively, the drive plate may be operably coupled to an external adjustment control that permits a user to translate the drive plate rearward, against the urging of the drive spring, thereby causing the bit alignment jaws to translate in an opening direction and away from the bit alignment jaw point of convergence. Additionally or alternatively, the external adjustment control may comprise a sleeve. Additionally or alternatively, the external adjustment control may comprise an adjustment tab that is disposed in a slot of a sleeve. Additionally or alternatively, the bit alignment jaws may be configured to translate within bit alignment jaw passageways of the body. Additionally or alternatively, the bit alignment jaws may translate in a direction that is substantially perpendicular to the center axis. Additionally or alternatively, the bit alignment jaws may be configured to translate in a direction that forms an acute angle with the center axis.

According to some example embodiments, another example chuck is proved that may be configured to be operably coupled to a power driver having a rotatable drive spindle. The example chuck may comprise a body having a center axis about which the body rotates, a sleeve that is externally disposed and configured to rotate relative to the body, and a clamping jaw nut configured to rotate relative to the body with the sleeve. The clamping jaw nut may comprise a clamping jaw nut thread. The example chuck may further comprise a plurality of clamping jaws configured to clamp onto a working bit. In this regard, each clamping jaw may comprise a clamping jaw thread that is configured to operably couple with the clamping jaw nut thread. The clamping jaws may also be configured to angularly translate relative to the center axis within clamping jaw passageways of the body towards or away from a clamping jaw point of convergence to close or open a working bit opening defined by the clamping jaws due to the operable coupling of the clamping jaw nut thread with the clamping jaw threads. Further, the clamping jaw point of convergence is on the center axis. The example chuck may further comprise a plurality of bit alignment jaws. The bit alignment jaws may be configured to maintain the working bit within the working bit opening by being configured translate towards or away from a bit alignment jaw point of convergence that is on the center axis and disposed rearward of the clamping jaw point of convergence. Additionally, according to some example embodiments, each bit alignment jaw may be configured to translate into the working bit opening in between two clamping jaws. Additionally or alternatively, each bit alignment jaw may include bit alignment jaw threading, and the example chuck may further comprise a bit alignment jaw nut including bit alignment jaw nut threading that engages with the bit alignment jaw threading of the bit alignment jaws such that rotation of the bit alignment jaw nut causes translation of the bit alignment jaws. Additionally or alternatively, the bit alignment nut may comprise a bit alignment plate having the bit alignment nut threading disposed on a face of the bit alignment plate. Additionally or alternatively, the example chuck further comprises a drive plate and a drive spring. In this regard, the bit alignment jaws may be operably coupled to drive plate, and the drive spring may be configured to urge the drive plate in a forward direction and cause the bit alignment jaws to translate in a closing direction toward the bit alignment jaw point of convergence. Additionally or alternatively, the drive plate may be operably coupled to an external adjustment member that permits a user to translate the drive plate rearward, against the urging of the drive spring, thereby causing the bit alignment jaws to translate in an opening direction and away from the bit alignment jaw point of convergence. Additionally or alternatively, the external adjustment member may comprise an adjustment tab that is disposed in a slot of the sleeve. Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck configured to be operably coupled to a power driver having a rotatable drive spindle, the chuck comprising:
    a body having a center axis about which the body rotates;
    a plurality of clamping jaws configured to clamp onto a working bit, the clamping jaws being configured to angularly translate relative to the center axis within clamping jaw passageways of the body towards or away from a clamping jaw point of convergence to close or open a working bit opening defined by the clamping jaws, wherein the clamping jaw point of convergence is on the center axis; and
    a plurality of bit alignment jaws, wherein the bit alignment jaws are configured to maintain the working bit within the working bit opening by being configured to translate towards or away from a bit alignment jaw point of convergence that is on the center axis and disposed rearward of the clamping jaw point of convergence;
    wherein each bit alignment jaw includes bit alignment jaw threading; and
    wherein the chuck further comprises a bit alignment jaw nut having bit alignment jaw nut threading that engages with the bit alignment jaw threading such that rotation of the bit alignment jaw nut causes translation of the bit alignment jaws.

2. The chuck of claim 1, wherein each bit alignment jaw is disposed between two clamping jaws.

3. The chuck of claim 1, wherein each bit alignment jaw is configured to translate into the working bit opening in between two clamping jaws.

4. The chuck of claim 1 further comprising a sleeve that is externally disposed and configured to rotate relative to the body, wherein the sleeve is operably coupled to the clamping jaws and the bit alignment jaws to cause the clamping jaws and the bit alignment jaws to synchronously translate in response to rotation of the sleeve.

5. The chuck of claim 1, wherein the bit alignment nut comprises a bit alignment plate having the bit alignment nut threading disposed on a face of the bit alignment plate.

6. The chuck of claim 1, wherein the bit alignment jaws translate within bit alignment jaw passageways of the body.

7. The chuck of claim 1, wherein the bit alignment jaws translate in a direction that is substantially perpendicular to the center axis.

8. The chuck of claim 1, wherein the bit alignment jaws translate in a direction that forms an acute angle with the center axis.

9. A chuck configured to be operably coupled to a power driver having a rotatable drive spindle, the chuck comprising:
- a body having a center axis about which the body rotates;
- a sleeve that is externally disposed and configured to rotate relative to the body;
- a clamping jaw nut configured to rotate relative to the body with the sleeve, the clamping jaw nut comprising a clamping jaw nut thread;
- a plurality of clamping jaws configured to clamp onto a working bit, each clamping jaw comprising a clamping jaw thread that is configured to operably couple with the clamping jaw nut thread, the clamping jaws being configured to angularly translate relative to the center axis within clamping jaw passageways of the body towards or away from a clamping jaw point of convergence to close or open a working bit opening defined by the clamping jaws due to the operable coupling of the clamping jaw nut thread with the clamping jaw threads, wherein the clamping jaw point of convergence is on the center axis; and
- a plurality of bit alignment jaws, wherein the bit alignment jaws are configured to maintain the working bit within the working bit opening by being configured to translate towards or away from a bit alignment jaw point of convergence that is on the center axis and disposed rearward of the clamping jaw point of convergence;
- wherein each bit alignment jaw includes bit alignment jaw threading; and
- wherein the chuck further comprises a bit alignment jaw nut including bit alignment jaw nut threading that engages with the bit alignment jaw threading of the bit alignment jaws such that rotation of the bit alignment jaw nut causes translation of the bit alignment jaws.

10. The chuck of claim 9, wherein each bit alignment jaw is configured to translate into the working bit opening in between two clamping jaws.

11. The chuck of claim 9, wherein the bit alignment nut comprises a bit alignment plate having the bit alignment nut threading disposed on a face of the bit alignment plate.

12. A chuck configured to be operably coupled to a power driver having a rotatable drive spindle, the chuck comprising:
- a body having a center axis about which the body rotates;
- a plurality of clamping jaws configured to clamp onto a working bit, the clamping jaws being configured to angularly translate relative to the center axis within clamping jaw passageways of the body towards or away from a clamping jaw point of convergence to close or open a working bit opening defined by the clamping jaws, wherein the clamping jaw point of convergence is on the center axis;
- a plurality of bit alignment jaws, wherein the bit alignment jaws are configured to maintain the working bit within the working bit opening by being configured to translate towards or away from a bit alignment jaw point of convergence that is on the center axis and disposed rearward of the clamping jaw point of convergence;
- a drive plate; and
- a drive spring;
- wherein the bit alignment jaws are operably coupled to the drive plate;
- wherein the drive spring is configured to urge the drive plate in a forward direction and cause the bit alignment jaws to translate in a closing direction toward the bit alignment jaw point of convergence;
- wherein the drive plate is operably coupled to an external adjustment control that permits a user to directly contact and slide the external adjustment control rearward, relative to the sleeve, to translate the drive plate rearward, against the urging of the drive spring, thereby causing the bit alignment jaws to translate in an opening direction and away from the bit alignment jaw point of convergence.

13. The chuck of claim 12, wherein the external adjustment control comprises a sleeve.

14. The chuck of claim 12, wherein the external adjustment control comprises an adjustment tab that is disposed in a slot of a sleeve.

* * * * *